United States Patent
Cirone et al.

(10) Patent No.: US 12,019,534 B2
(45) Date of Patent: *Jun. 25, 2024

(54) OUT-OF-THE-BOX TELEMETRY FOR RICH-CLIENT APPLICATION RUNTIME FRAMEWORKS

(71) Applicant: Oracle International Corporation, Redwood Shores, CA (US)

(72) Inventors: Kevin J. Cirone, Woburn, MA (US); Blake T. Sullivan, Redwood City, CA (US); Dipankar Bajpai, Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,849

(22) Filed: Apr. 28, 2023

(65) Prior Publication Data
US 2023/0267064 A1  Aug. 24, 2023

Related U.S. Application Data

(63) Continuation of application No. 17/339,676, filed on Jun. 4, 2021, now Pat. No. 11,681,605.

(Continued)

(51) Int. Cl.
*G06F 9/44* (2018.01)
*G06F 9/54* (2006.01)
(Continued)

(52) U.S. Cl.
CPC .......... *G06F 11/3476* (2013.01); *G06F 9/542* (2013.01); *G06F 11/3636* (2013.01); *G06F 12/0802* (2013.01); *G06F 2212/60* (2013.01)

(58) Field of Classification Search
None
See application file for complete search history.

(56) References Cited

U.S. PATENT DOCUMENTS

| 9,298,589 B2 | 3/2016 | Gautallin et al. |
| 11,339,673 B2 | 5/2022 | Roberge |

(Continued)

OTHER PUBLICATIONS

U.S. Appl. No. 17/990,576, Corrected Notice of Allowability, dated May 30, 2023, 2 pages.

(Continued)

*Primary Examiner* — Qamrun Nahar
(74) *Attorney, Agent, or Firm* — Kilpatrick Townsend & Stockton LLP

(57) ABSTRACT

Disclosed systems relate to automatically instrumenting a web application for tracing. In an example, a method includes providing a web page application to a web browser on a client device. The web page application includes a tracer application. The method further includes detecting a start of the web page application and instantiating tracer application. The tracer application is configured to log tracing data for the web page application. The method further includes detecting an event initiated by interaction with the web page application. The method further includes automatically logging a start of a span based on the detection, the logging associating the span with the tracer application. The method further includes executing operations corresponding to the event. The method further includes automatically logging an end of the span based upon a completion of the operations corresponding to the event.

20 Claims, 16 Drawing Sheets

Related U.S. Application Data

(60) Provisional application No. 63/077,649, filed on Sep. 13, 2020.

(51) Int. Cl.
 *G06F 11/34* (2006.01)
 *G06F 11/36* (2006.01)
 *G06F 12/0802* (2016.01)

(56) References Cited

U.S. PATENT DOCUMENTS

| | | |
|---|---|---|
| 11,429,509 B2 | 8/2022 | Cirone et al. |
| 11,544,172 B2 | 1/2023 | Cirone et al. |
| 11,586,525 B2 | 2/2023 | Cirone et al. |
| 11,681,605 B2 | 6/2023 | Cirone et al. |
| 11,693,758 B2 | 7/2023 | Cirone et al. |
| 11,797,417 B2 | 10/2023 | Cirone et al. |
| 2004/0267702 A1 | 12/2004 | Gallant et al. |
| 2005/0021736 A1 | 1/2005 | Carusi et al. |
| 2005/0223048 A1 | 10/2005 | Smith et al. |
| 2006/0155907 A1 | 7/2006 | Yoshida et al. |
| 2007/0101206 A1 | 5/2007 | Brabant |
| 2009/0119645 A1 | 5/2009 | Begg et al. |
| 2010/0011341 A1 | 1/2010 | Baierl et al. |
| 2010/0115284 A1 | 5/2010 | Hahn et al. |
| 2010/0162247 A1 | 6/2010 | Welc et al. |
| 2011/0264787 A1 | 10/2011 | Mickens et al. |
| 2013/0185643 A1 | 7/2013 | Greifeneder et al. |
| 2013/0204932 A1 | 8/2013 | Savage et al. |
| 2013/0254313 A1 | 9/2013 | Kudikala et al. |
| 2014/0053056 A1 | 2/2014 | Weber et al. |
| 2014/0317605 A1 | 10/2014 | Gataullin et al. |
| 2015/0242303 A1 | 8/2015 | Gautallin et al. |
| 2015/0281035 A1* | 10/2015 | Melikyan ............ G06F 11/3466 709/224 |
| 2015/0347277 A1* | 12/2015 | Gataullin ............ G06F 11/3466 717/128 |
| 2016/0041894 A1 | 2/2016 | Reid, III et al. |
| 2016/0112822 A1 | 4/2016 | Giral et al. |
| 2017/0091216 A1 | 3/2017 | Fuchs et al. |
| 2017/0132111 A1* | 5/2017 | Ravindranath Sivalingam ............ G06F 11/3476 |
| 2017/0132181 A1 | 5/2017 | Van As et al. |
| 2018/0032905 A1 | 2/2018 | Abercrombie |
| 2019/0303178 A1 | 10/2019 | Mastracci |
| 2020/0372007 A1 | 11/2020 | Ross et al. |
| 2021/0051179 A1 | 2/2021 | Hulick |
| 2021/0157583 A1* | 5/2021 | Yuile .................. G06F 16/1734 |
| 2021/0182267 A1* | 6/2021 | Andreakis ........... G06F 16/2365 |

OTHER PUBLICATIONS

U.S. Appl. No. 17/339,682, Corrected Notice of Allowability, dated Aug. 7, 2023, 8 pages.
U.S. Appl. No. 17/339,682, Notice of Allowance, dated Jul. 19, 2023, 11 pages.
"Cross-Origin Resource Sharing (CORS)", Available online at https://developer.mozilla.org/en-US/docs/Web/HTTP/CORS, Accessed from Internet on: Jul. 14, 2021, pp. 1-19.
"Jaeger: Open Source, End-to-End Distributed Tracing", Available online at https://www.jaegertracing.io/, Accessed from Internet on: Jul. 14, 2021, pp. 1-7.
"The OpenTracing Semantic Specification", Available online at https://opentracing.io/specification/, Accessed from Internet on: Jul. 14, 2021, pp. 1-11.
"Thread Pools", Available online at https://docs.oracle.com/javase/tutorial/essential/concurrency/pools.html, Accessed from Internet on: Jul. 14, 2021, 1 page.
U.S. Appl. No. 17/339,673, Non-Final Office Action, dated Apr. 28, 2022, 23 pages.
U.S. Appl. No. 17/339,673, Notice of Allowance, dated Oct. 18, 2022, 10 pages.
U.S. Appl. No. 17/339,676, Non-Final Office Action, dated Oct. 20, 2022, 13 pages.
U.S. Appl. No. 17/339,676, Notice of Allowance, dated Mar. 15, 2023, 2 pages.
U.S. Appl. No. 17/339,676, Notice of Allowance, dated Feb. 8, 2023, 8 pages.
U.S. Appl. No. 17/339,680, Notice of Allowance, dated Apr. 27, 2022, 9 pages.
U.S. Appl. No. 17/339,682, Final Office Action, dated Feb. 14, 2023, 11 pages.
U.S. Appl. No. 17/339,682, Non-Final Office Action, dated Oct. 20, 2022, 10 pages.
U.S. Appl. No. 17/855,686, Notice of Allowance, dated Sep. 21, 2022, 9 pages.
U.S. Appl. No. 17/990,576, Notice of Allowance, dated Mar. 14, 2023, 9 pages.
U.S. Appl. No. 18/152,701, Non-Final Office Action, dated May 25, 2023, 37 pages.
International Application No. PCT/US2021/035996, International Preliminary Report on Patentability, dated Mar. 23, 2023, 9 pages.
International Application No. PCT/US2021/035996, International Search Report and the Written Opinion, dated Oct. 5, 2021, 12 pages.
International Application No. PCT/US2021/036003, International Preliminary Report on Patentability, dated Mar. 23, 2023, 10 pages.
International Application No. PCT/US2021/036003, International Search Report and Written Opinion, dated Oct. 5, 2021, 14 pages.
International Application No. PCT/US2021/036007, International Preliminary Report on Patentability, dated Mar. 23, 2023, 9 pages.
International Application No. PCT/US2021/036007, International Search Report and Written Opinion, dated Oct. 5, 2021, 12 pages.
U.S. Appl. No. 18/140,849, "Non-Final Office Action", dated Nov. 8, 2023, 11 pages.
U.S. Appl. No. 18/152,701, "Notice of Allowance", dated Nov. 13, 2023, 12 pages.
U.S. Appl. No. 18/463,858, "Non-Final Office Action", mailed Apr. 11, 2024, 8 pages.

* cited by examiner

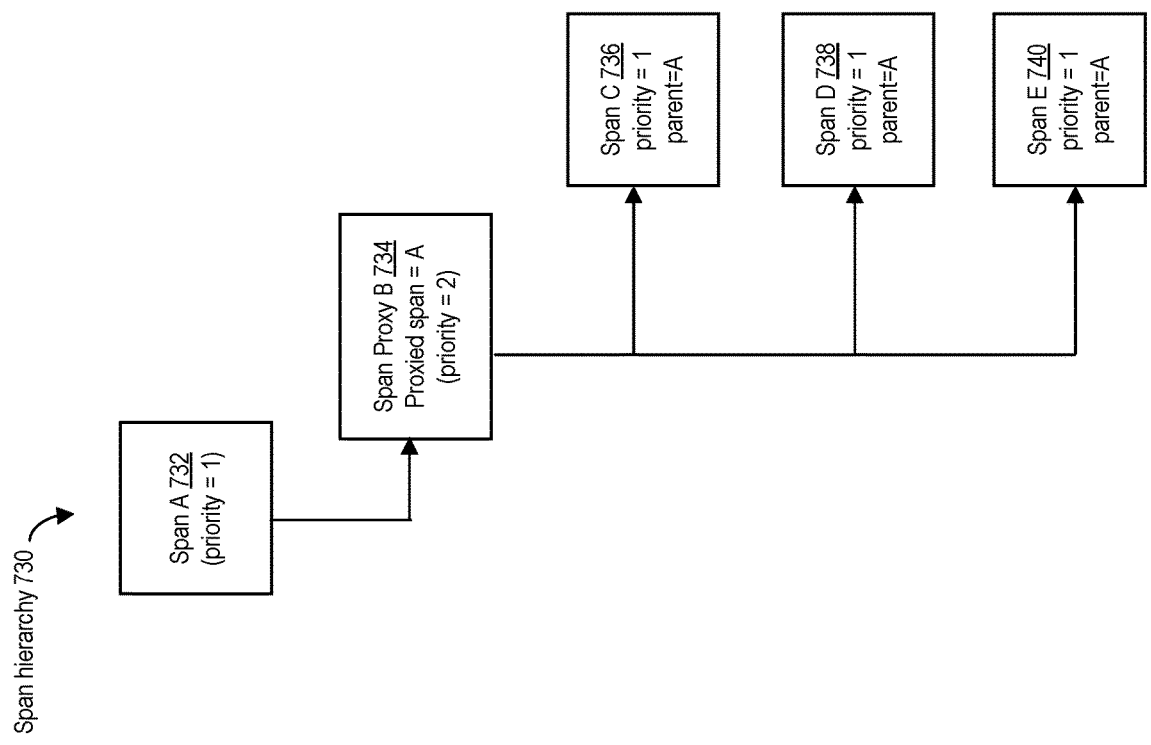
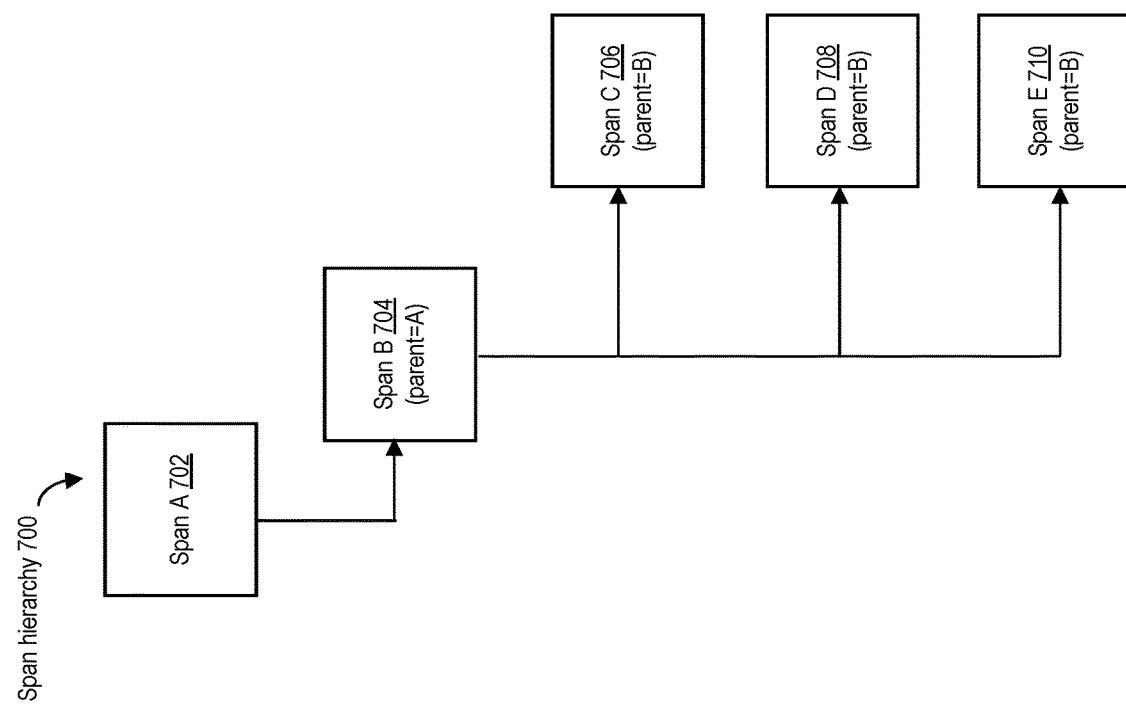
FIG. 7

```
POST /myendpoint/
myservice HTTP/1.1
Host: bar.other
Connection: keep-alive
Content-Type: text/xml;
charset=UTF-8 Content-
Length: 55
Origin: https://foo.example
```

1310

```
POST /myendpoint/
myservice HTTP/1.1
Host: bar.other
Connection: keep-alive
Content-Type: text/xml;
charset=UTF-8 Content-
Length: 55
Origin: https://foo.example
x-b3-spanid: 1b3178199ebc1
x-b3-traceid:
bec35891abac1ef4668efc12
x-b3-sampled: 1
x-b3-parentspanid: ef123a1bc211
ecid-context: 1.bec35891abac1ef4668efc12@@1b3178199ebc1;kXjE
```

OUT-OF-THE-BOX TELEMETRY FOR RICH-CLIENT APPLICATION RUNTIME FRAMEWORKS

CROSS-REFERENCE TO RELATED APPLICATIONS

The present application is a continuation of, and claims the benefit and priority to U.S. application Ser. No. 17/339,676, filed Jun. 4, 2021, entitled "OUT-OF-THE-BOX TELEMETRY FOR RICH-CLIENT APPLICATION RUNTIME FRAMEWORKS," which claims the benefit and priority of U.S. Application No. 63/077,649, filed Sep. 13, 2020, which is hereby incorporated by reference in their entirety for all purposes.

This application is related to co-pending U.S. patent application Ser. No. 17/339,682 titled "Smart Distributed Tracing Context Injection," filed Jun. 4, 2021, co-pending U.S. patent application Ser. No. 17/339,680 titled "Smart Span Prioritization Based On Ingestion Service Backpressure," filed Jun. 4, 2021, and co-pending U.S. patent application Ser. No. 17/339,673 titled "Automatic Span Context Propagation to Worker Threads in Rich-Client Applications," filed Jun. 4, 2021, the contents of which are hereby incorporated by reference in their entirety for all purposes.

BACKGROUND

As web-based applications become more advanced, traditional tracer applications may be unable to capture accurate telemetry data across servers, platforms, or threads. Disclosed solutions facilitate improved telemetry capabilities and analytics that overcome these deficiencies.

BRIEF SUMMARY

In an aspect, a method of automatically instrumenting a web application for tracing includes providing a web page application to a web browser on a client device. The web page application includes a tracer application. The method further includes detecting a start of the web page application. The method further includes instantiating, based on a start of the web page application, the tracer application. The tracer application is configured to log tracing data for the web page application. The method further includes detecting an event initiated by interaction with the web page application. The method further includes automatically logging a start of a span based on the detection, the logging associating the span with the tracer application. The method further includes executing operations corresponding to the event. The method further includes automatically logging an end of the span based upon a completion of the operations corresponding to the event.

In another aspect, automatically logging the end of the span includes determining one or more of: (i) a number of processing cycles corresponding to the execution of the operations or (ii) an execution time of the operations.

In another aspect, the event is selected from the group consisting of a click event, a navigation to a page, a user interface refresh, and a representational state transfer (REST) call.

In another aspect, the event is a click event and the span represents instrumentation related to determining an action to perform based on the click event and performing the action.

In another aspect, the operations include a first operation and a second operation. The method further includes creating a first child span corresponding to the first operation. The method further includes automatically logging an end of the first child span based on completion of the first operation. The method further includes creating a second child span corresponding to the second operation. The first child span and the second child span are children of the span. The method further includes automatically logging an end of the first child span based on completion of the first operation. The method further includes associating the first child span and the second child span with the span.

In another aspect, the span is a parent span. The method further includes sending, based on the operations, a request for an object to an external server. The method further includes creating a child span based on the sending. The method further includes receiving the object from the external server. The method further includes automatically logging an end of the child span responsive to receiving the object. The method further includes associating the child span with the parent span.

In an aspect, the request is a representational state transfer (REST) call.

The above methods can be implemented as tangible computer-readable media and/or operating within a computer processor and attached memory.

BRIEF DESCRIPTION OF THE DRAWINGS

FIG. 7 depicts an example of a span hierarchy with prioritization, according to certain aspects of the disclosure.

FIG. 13 depicts an example of headers, according to certain aspects of the disclosure.

DETAILED DESCRIPTION

Figure 1:
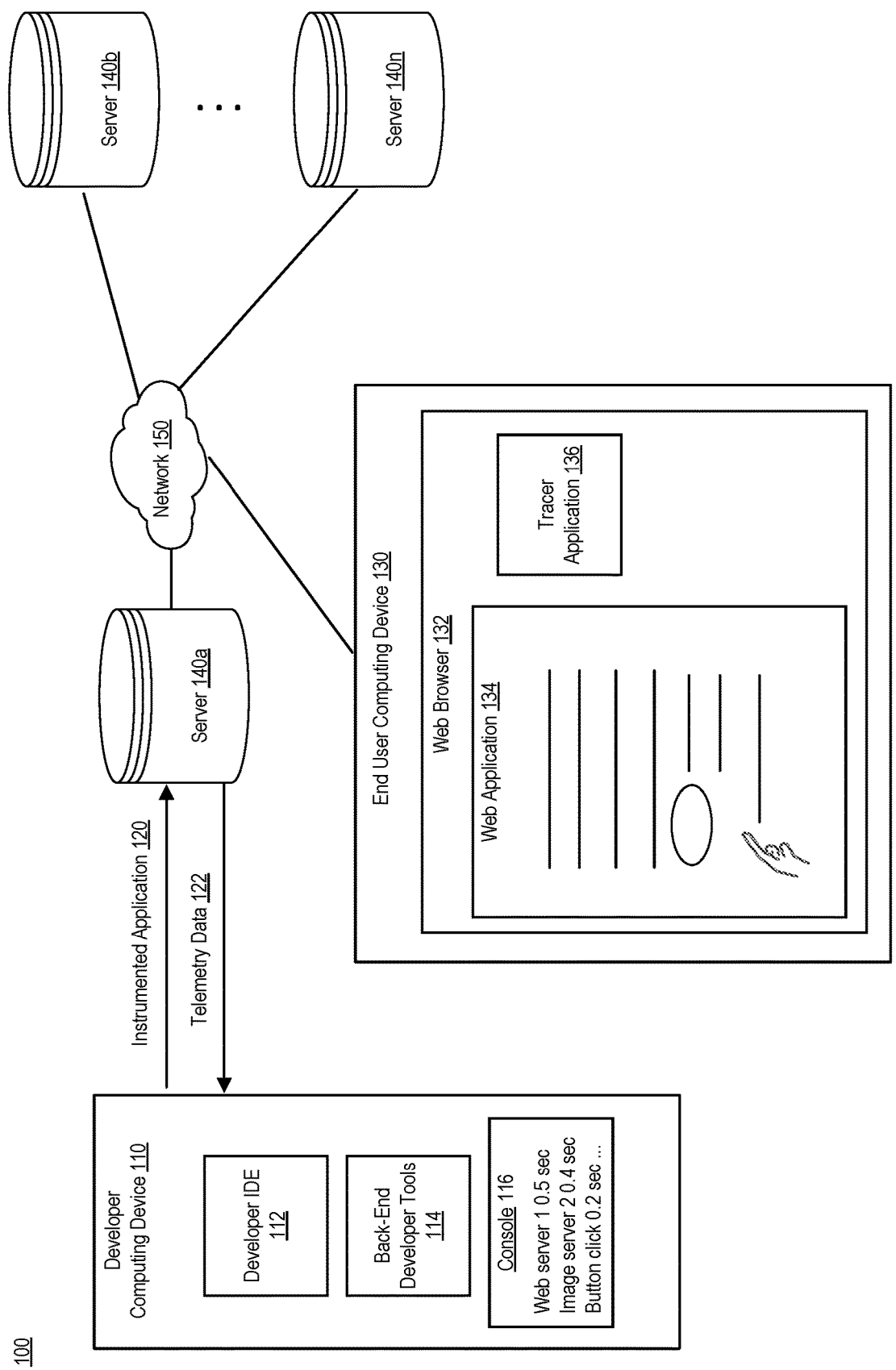
FIG. 1 depicts an example of a system for automatically instrumenting enterprise applications with telemetry, according to an aspect of the present disclosure.

Techniques disclosed herein provide solutions for automatically providing telemetry capabilities for enterprise applications. Telemetry refers to gathering of reporting performance data about the runtime execution of software. Examples of such data include how often certain features on a web page or application are used, measurements of start-up time or execution time, whether a process crashed, failure information, and user experiences. Telemetry data can be gathered on an application basis, or on a more granular level, such as runtime metrics on how long each process of the web page took to complete. Disclosed solutions use Application Programmer Interface (API) capabilities to enable access to the telemetry data.

As discussed, existing solutions suffer from deficiencies. For instance, some existing solutions may require a manual importing or linking of a tracing library followed by adding of one or more function calls around parts of code on which instrumentation data is desired. Additionally, such solutions can require developers to select instrumentation libraries from one or more vendors and configure those libraries. By contrast, disclosed solutions automatically instrument web-based applications by detecting events and calls to servers in code and automatically instrumenting those events.

In an aspect, disclosed systems can automatically instrument an enterprise application without requiring input from a software developer. Certain aspects of the present disclosure relate to software development tools that provide a runtime telemetry framework that can be automatically integrated into a custom application designed by a software developer. For example, software development tools can automatically inject tracing functionality into an enterprise application. The tracing functionality automatically track operations such as user interactions, page navigation, and server calls and groups related logical transactions together in such a way as to enable end-to-end tracing from a click of a user on a web page, including a distributed server system (heterogeneous or otherwise) that implements back-end services.

In another aspect, disclosed systems enable the prioritization of one or more spans and messages relating to the spans to minimize network congestion caused in some cases by a high amount of instrumentation data. For instance, at runtime or before, a particular span can be designated lower priority, which causes the instrumentation to not measure performance of the particular span while still gathering data for child spans, which may be of greater interest to a developer.

In yet another aspect, disclosed solutions involve enabling developers of web-based applications can obtain detailed instrumentation about one or more processes executing as part of the enterprise application, regardless of whether the processes include multiple threads. At runtime execution of the application, the telemetry framework facilitates instrumentation across various processes, threads, and servers. In this manner, the instrumentation context is maintained across threads, resulting in more granular instrumentation data.

In another aspect, disclosed systems facilitate telemetry across a distributed system, including on distributed servers that, due to security requirements or for other reasons, may not automatically permit instrumentation indicated by way of tracing headers. More specifically, certain aspects can automatically discover protocol support and adjust injection of tracing information into different calls based on protocol support. Disclosed systems are therefore able to obtain detailed telemetry data for processes that execute on remote servers, and in particular, remote servers that are accessed by a cross-domain request. Such servers can be operated by different entities in different domains.

Figure 2:
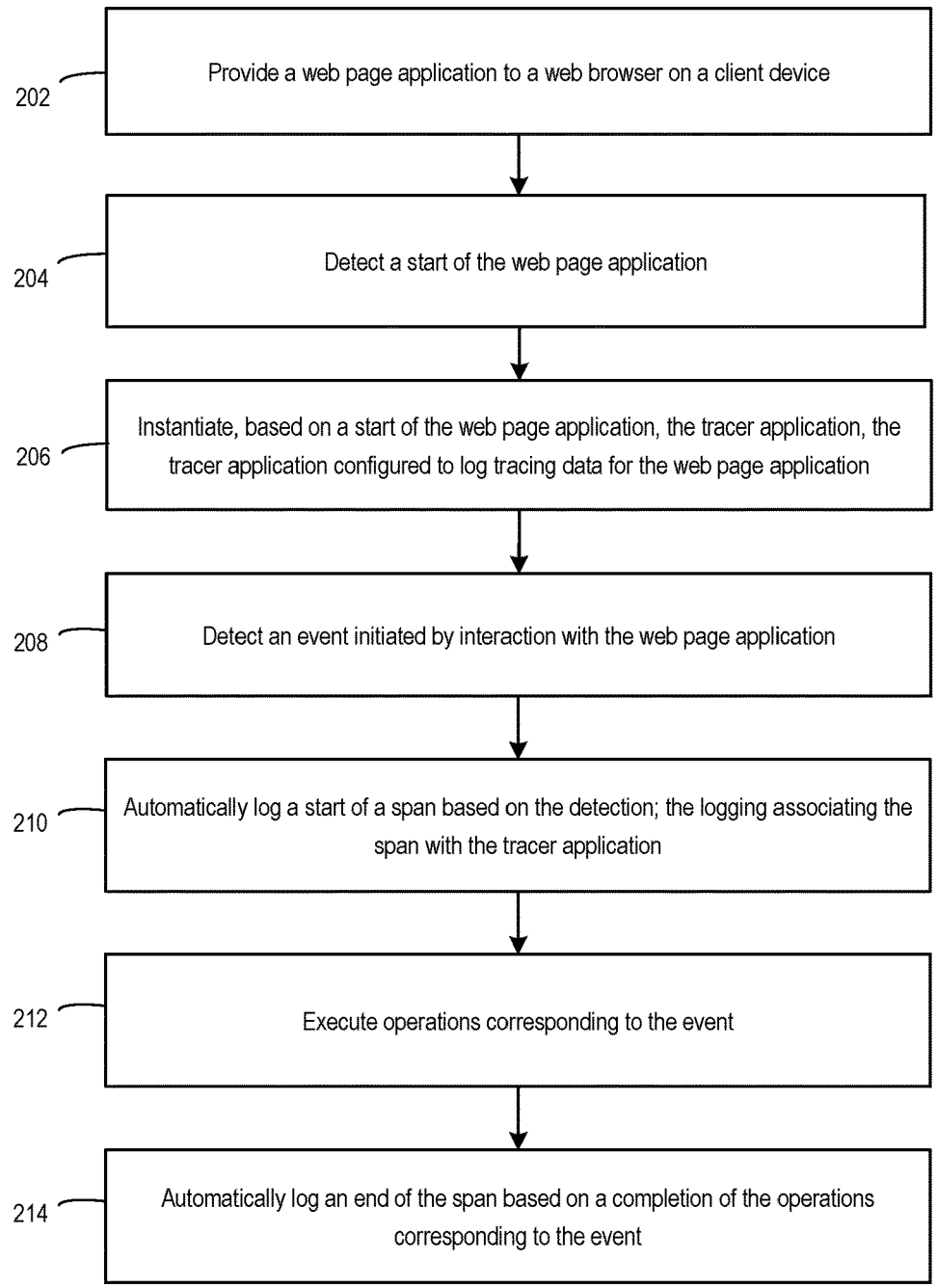
FIG. 2 depicts an example of a process used to gather telemetry data, according to an aspect of the present disclosure.
Figure 3:
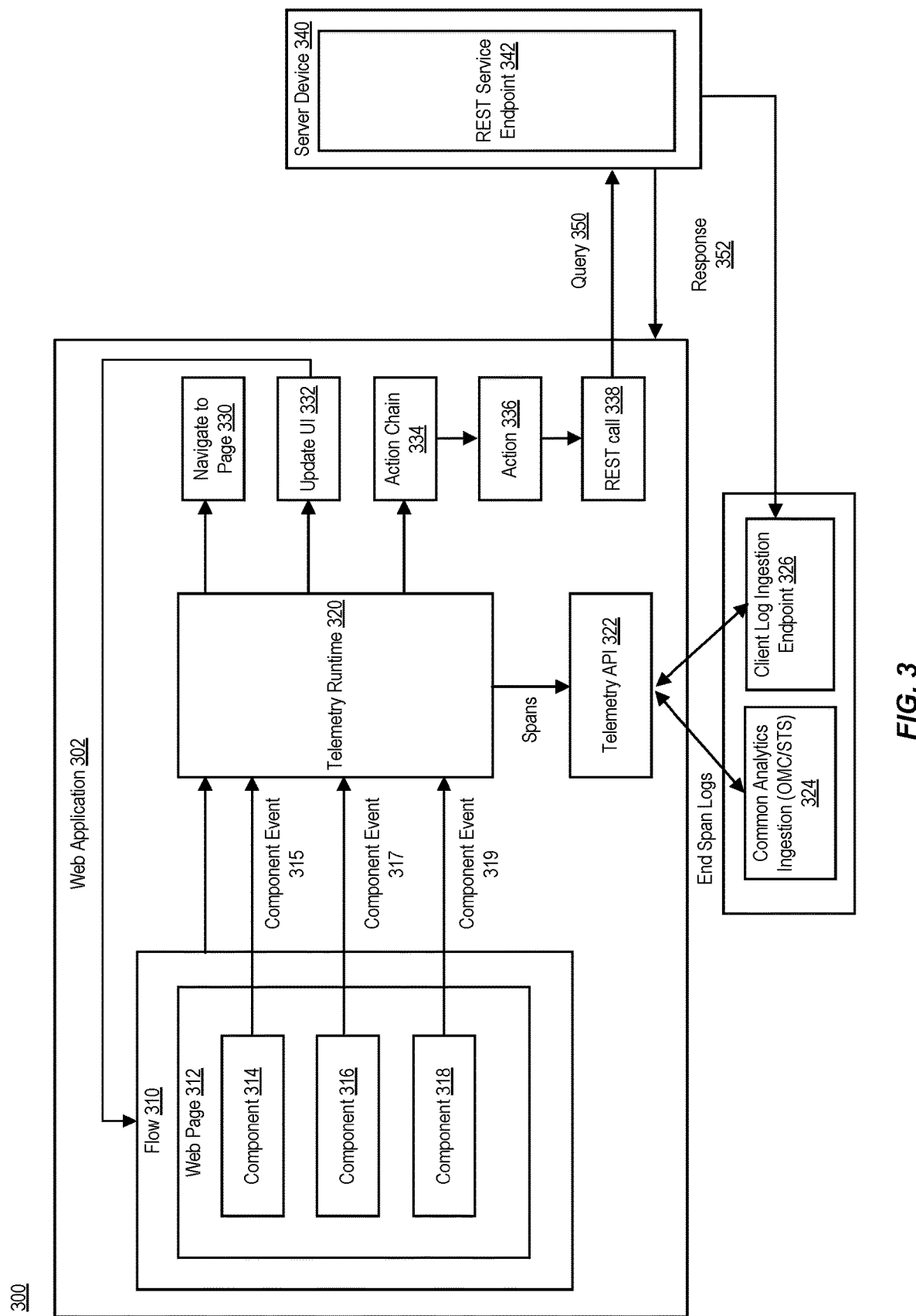
FIG. 3 depicts an example of an instrumented application for generating span context, according to certain aspects of the disclosure.
Figure 14:
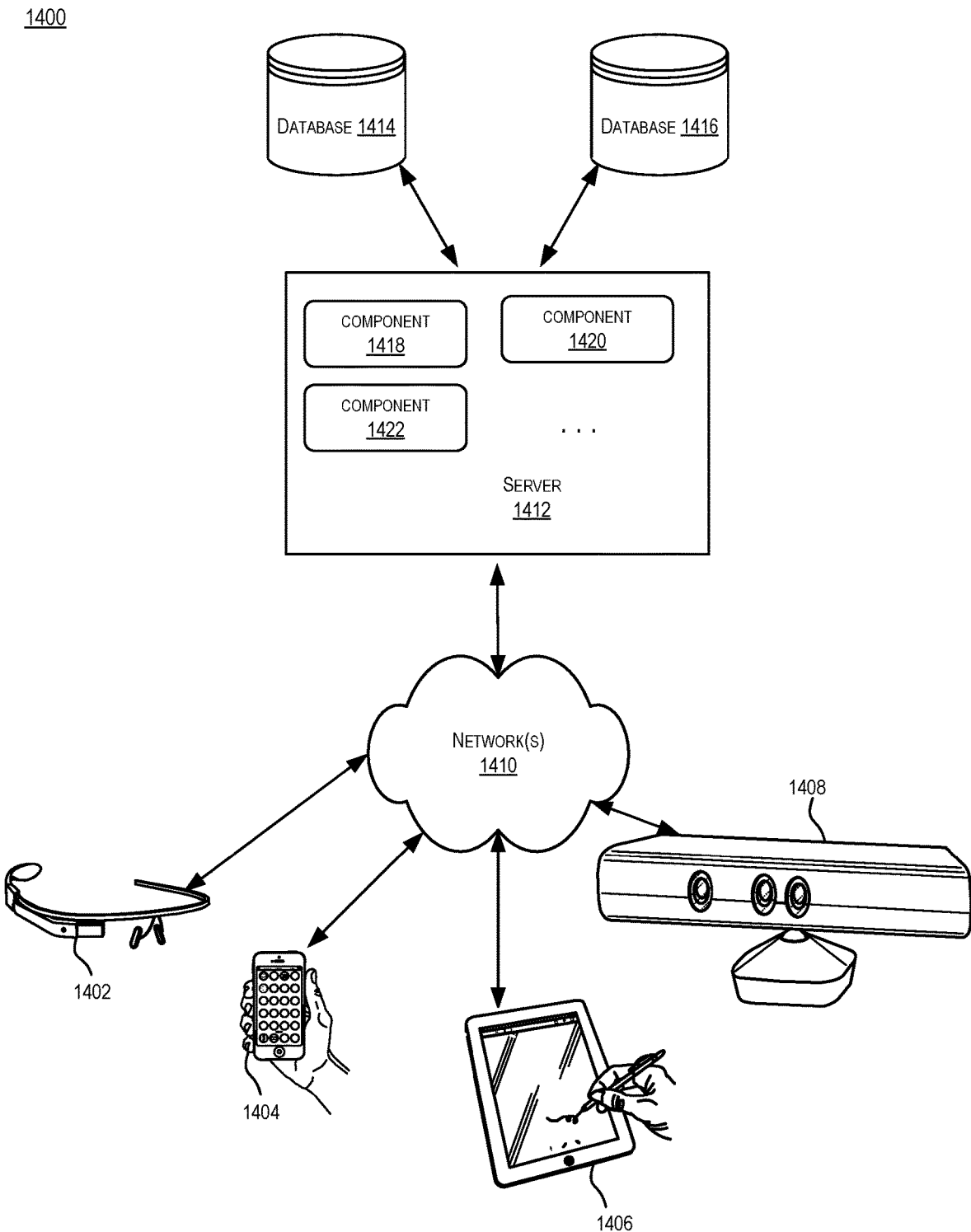
FIG. 14 depicts a simplified diagram of a distributed system for implementing one of the aspects.

FIG. 1 depicts an example of a system for automatically instrumenting enterprise applications with telemetry, according to an aspect of the present disclosure. FIG. 1 depicts developer computing device 110, end user computing device 130, network 150, and servers 140*a-n*. In the example depicted in FIG. 1, developer computing device 110 builds instrumented application 120 and deploys instrumented application 120 to server 140*a*. Server 140*a*, in turn, serves the application to end user computing device 140. An example of a process used by an instrumented application to obtain telemetry data is shown in FIG. 2. An example of an instrumented application is shown in FIG. 3. Examples of suitable computing devices for developer computing device 110 and end user computing device 140 include those depicted in client computing devices 1402, 1404, 1406, and 1408 and examples of suitable servers include server 1412, are depicted in FIG. 14.

During or in connection with the execution of instrumented application 120, end user computing device 140 may connect with one or more servers 140*b-n* to obtain different resources (e.g., images, scripts, etc.) and/or perform instrumentation functions. During or after execution of the instrumented application 120, telemetry data 122 is communicated back to developer computing device 110 for analysis.

Developer computing device 110 includes one or more of developer integrated development environment (IDE) 112, back-end developer tools 114, console 116, and telemetry data 122. Developer IDE 112 is a graphical development tool that provides compiling, linking, debugging, tracing, or other functionality. Back-end developer tools 114 can include one or more compilers, linkers, debuggers, simulators, and so forth. Console 116 is used to view telemetry data 122 obtained by the execution of instrumented application 120. As depicted, telemetry data 122 includes data that a particular web page executed on "server 1" and took 0.5 seconds, an image load executed on "server 2" and took 0.4 seconds, and a button click caused 0.2 seconds of processing.

Servers 140*a-n* can be configured to perform identical, similar, or different functions. For example, servers 140*a-n* can operate as a distributed server system. In another example, servers 140*a-n* can be web-servers, file servers, or other servers that serve one or more components from web pages or can receive database queries and provide results. In some cases, servers 140*a-n* can be under the control of different entities (companies or individuals) and/or at different locations. Accordingly, certain aspects described herein relate to obtaining telemetry data across different servers via span context propagation. Developer computing device 110, end user computing device 140, network 150, and servers 140*a-n* can be connected across one or more connections such as network 150. Examples of network 150 include wired networks, wireless networks, and the Internet.

End user computing device 130 includes web application 134 (e.g., a web page), web browser 132, and tracer application 136. Web application 134 can be rendered by web browser 132. Tracer application 136, which can be part of web application 134, provides instrumentation capabilities. For instance, tracer application 136 collects telemetry data, which can be exported to an external device periodically or on-demand. Examples of telemetry data include how often certain features are used, measurements of start-up time or execution time, whether a process crashed, failure information, and user types.

In an example, a software developer builds a custom web-based application using developer IDE 112 and back-end developer tools 114. In particular, software tools running on developer computing device 110 insert code (e.g., tracer code) that provides telemetry capability, generating instrumented application 120. In some cases, instrumented application 120 can be sent directly from developer computing device 110 to end user computing device 140. In other cases, instrumented application 120 is sent directly to a server 140a-n, where instrumented application 120 is hosted and later downloaded by end user computing device 140.

End user computing device 140 accesses the application, for example, from server 140a across network 150. A user operating end user computing device 140 interacts with the application, which causes the end user computing device 140 to access one or more of servers 140a-n, which, in turn, serve all or part of the application to the end user computing device 140. End user computing device 140 executes the telemetry functionality, which causes operations caused directly by user interactions with the application (e.g., clicks, reloads) or indirectly (e.g., images linked from a page to be loaded, etc.) to be instrumented. In this manner, more detailed telemetry information is available than with previous solutions. The telemetry data 122 is gathered by one or more servers 140a-n.

As discussed, certain aspects relate to obtaining telemetry information from enterprise applications. To facilitate telemetry, within an enterprise application, one or more spans are created. As used herein, a span refers to a set of named operations that represent a unit of work. A particular span can refer to a process. A span has a span context. As used herein, a span context can include a trace identifier and a span identifier. Accordingly, a first process can have a first span and a second process a second span. If the second process is called by the first process, then the first and second spans are related by a parent-child relationship such that the first span is a parent and the second is a child. Tracking the spans of different processes facilitates a more detailed instrumentation.

Figure 8:
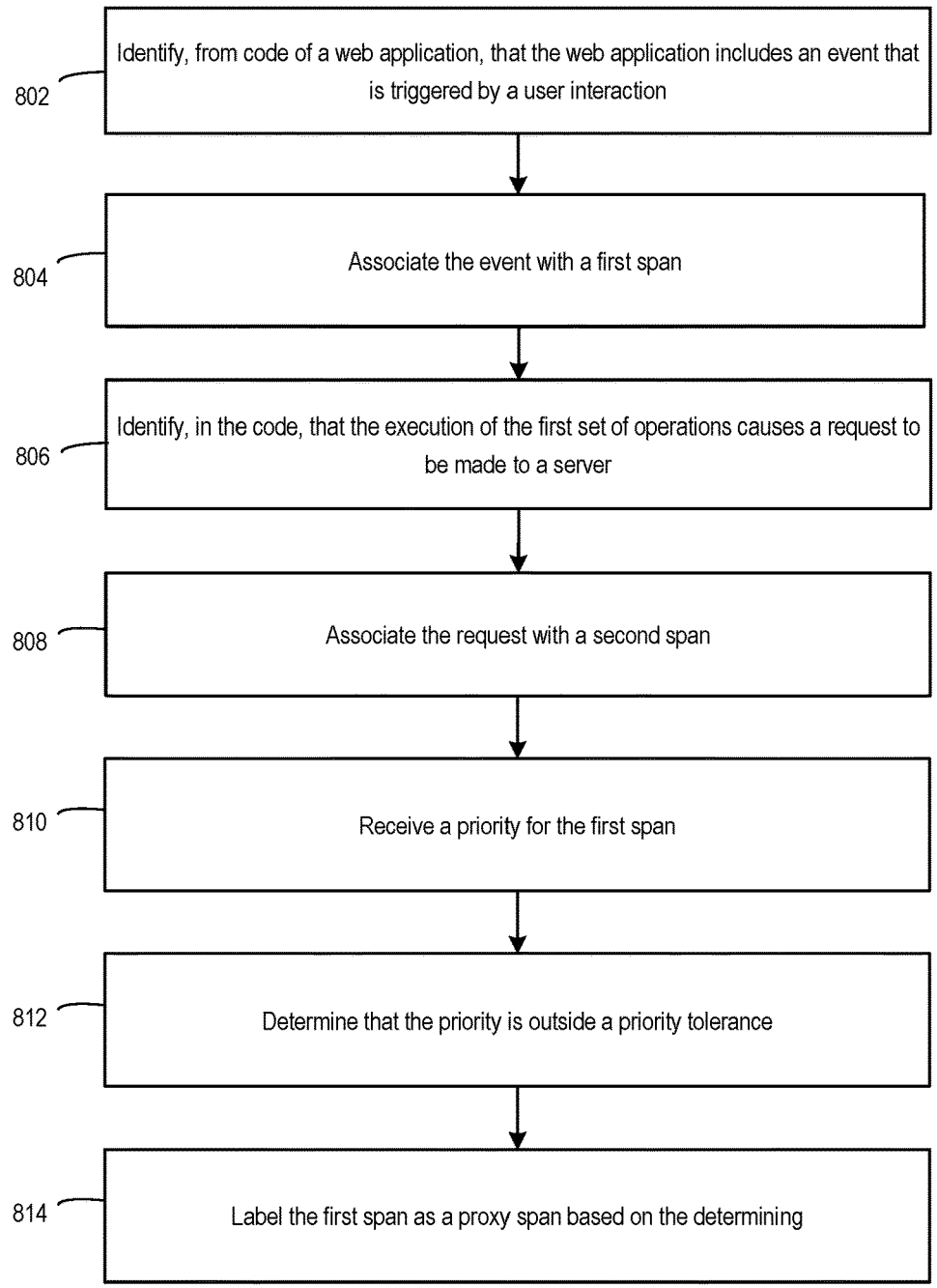
FIG. 8 depicts an example of a process for prioritizing spans, according to certain aspects of the disclosure.
Figure 9:
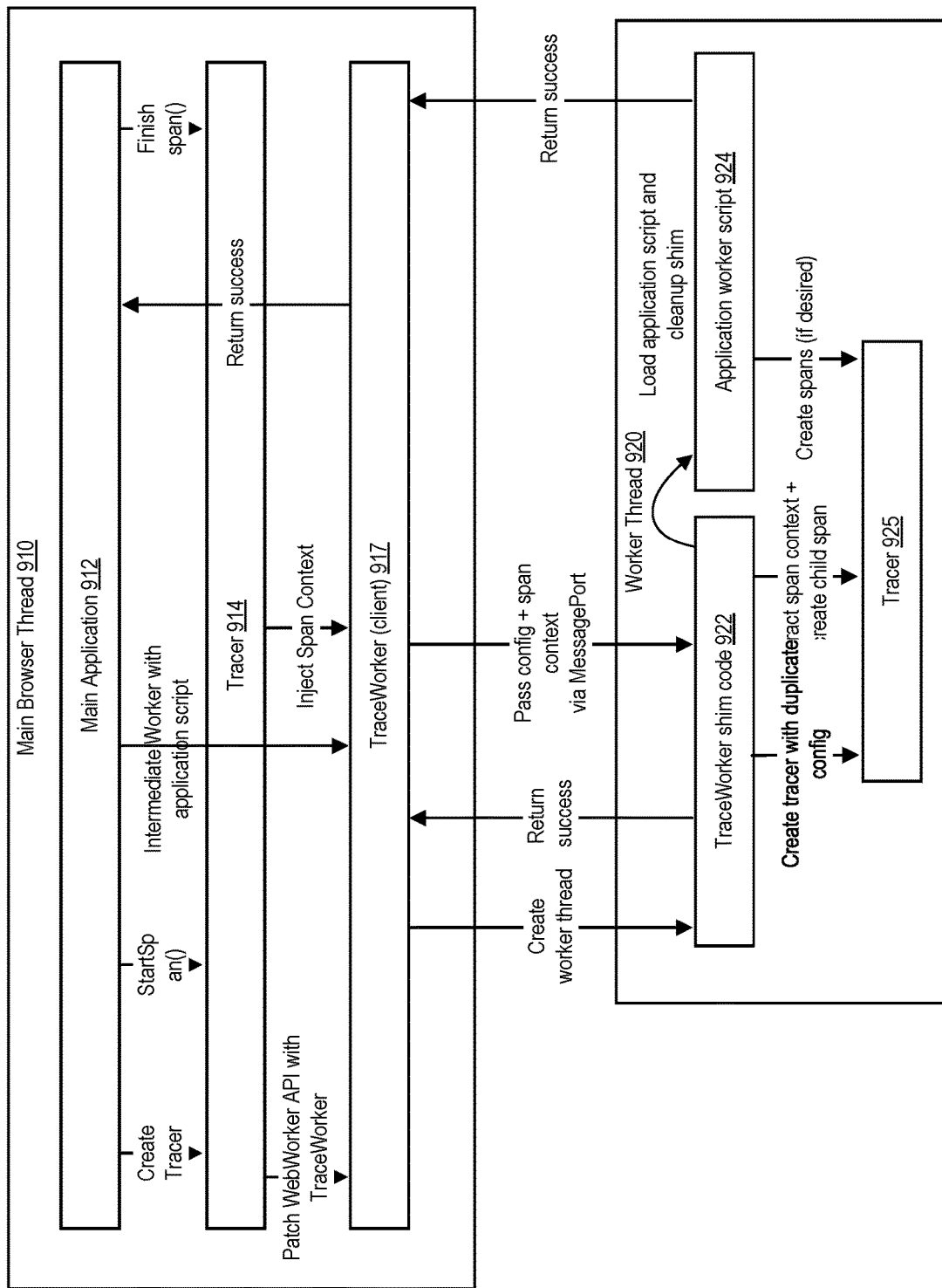
FIG. 9 depicts an example of a distributing tracing environment with a traceworker client, according to certain aspects of the disclosure.
Figure 10:
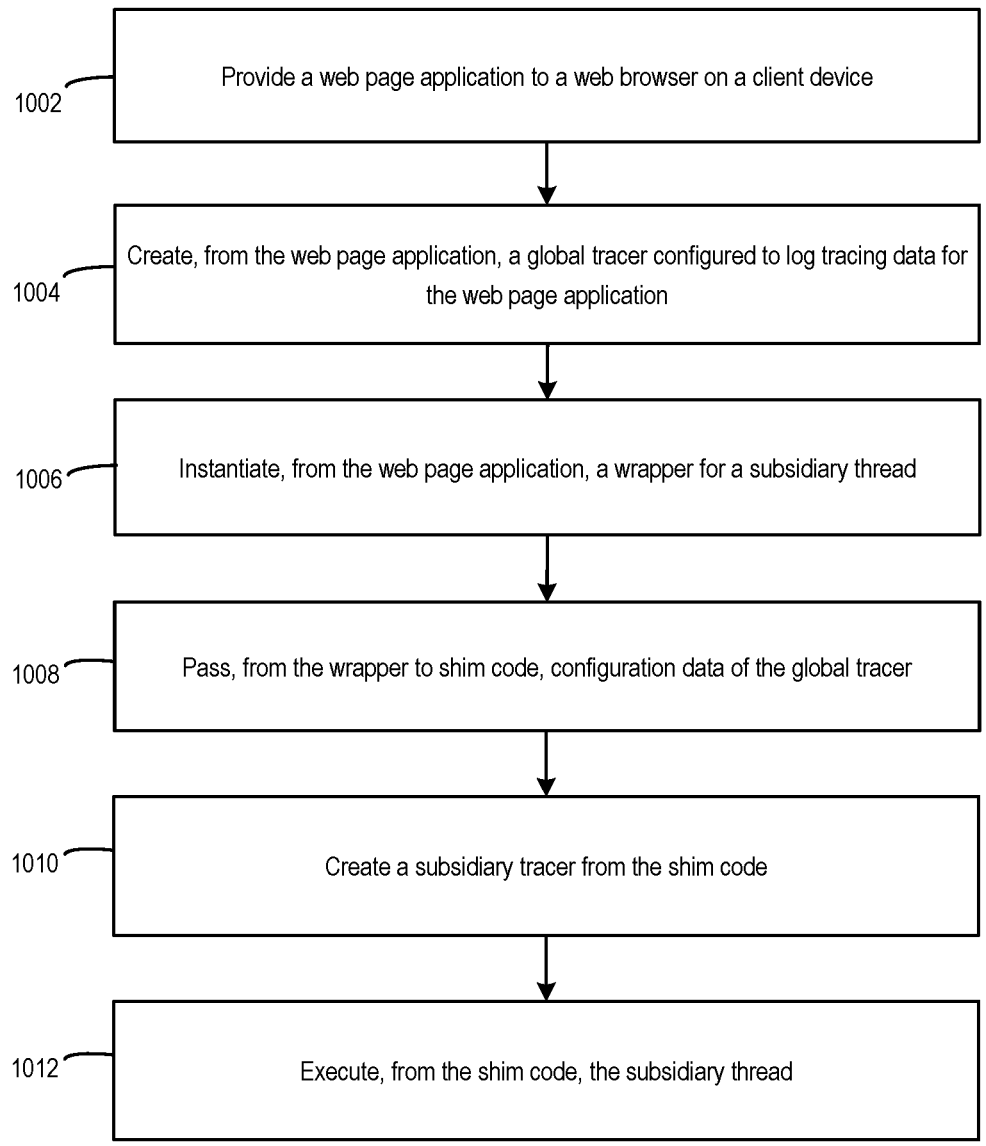
FIG. 10 depicts an example of a process for instrumenting threads, according to certain aspects of the disclosure.
Figure 11:
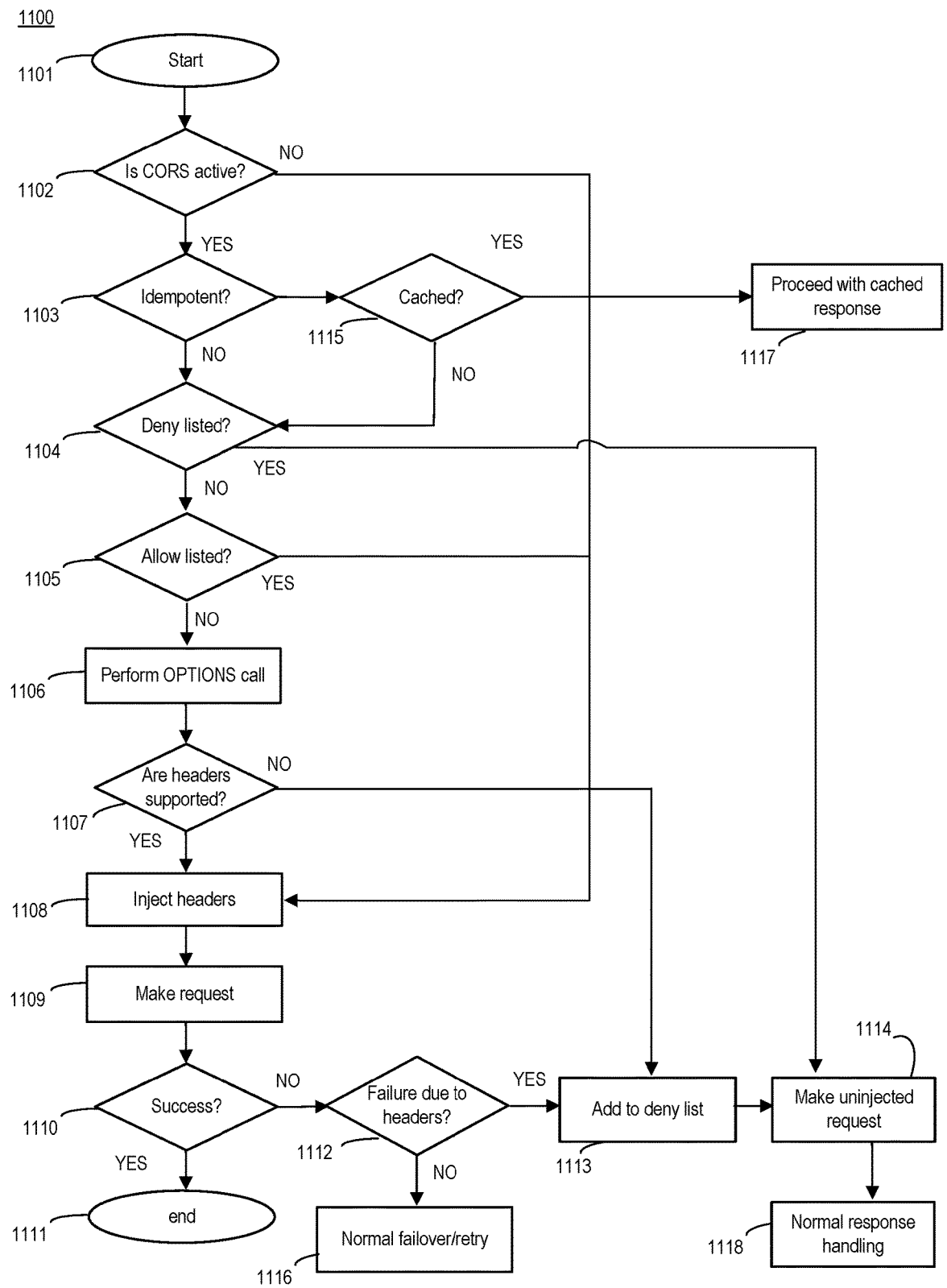
FIG. 11 depicts an example of a process for propagating tracing across a distributed software application, according to certain aspects of the disclosure.
Figure 12:
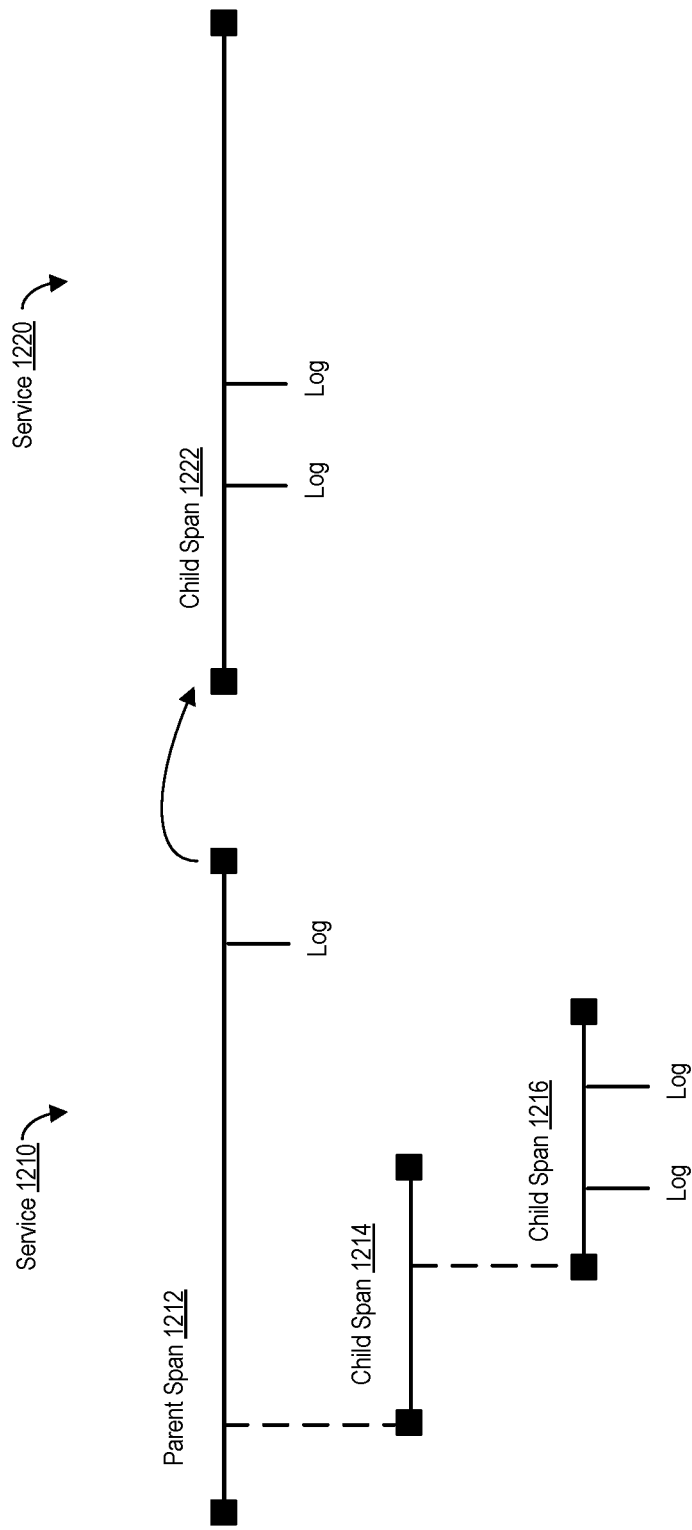
FIG. 12 depicts an example of propagating span context across a service in a distributed system, according to certain aspects of the disclosure.
Figure 15:
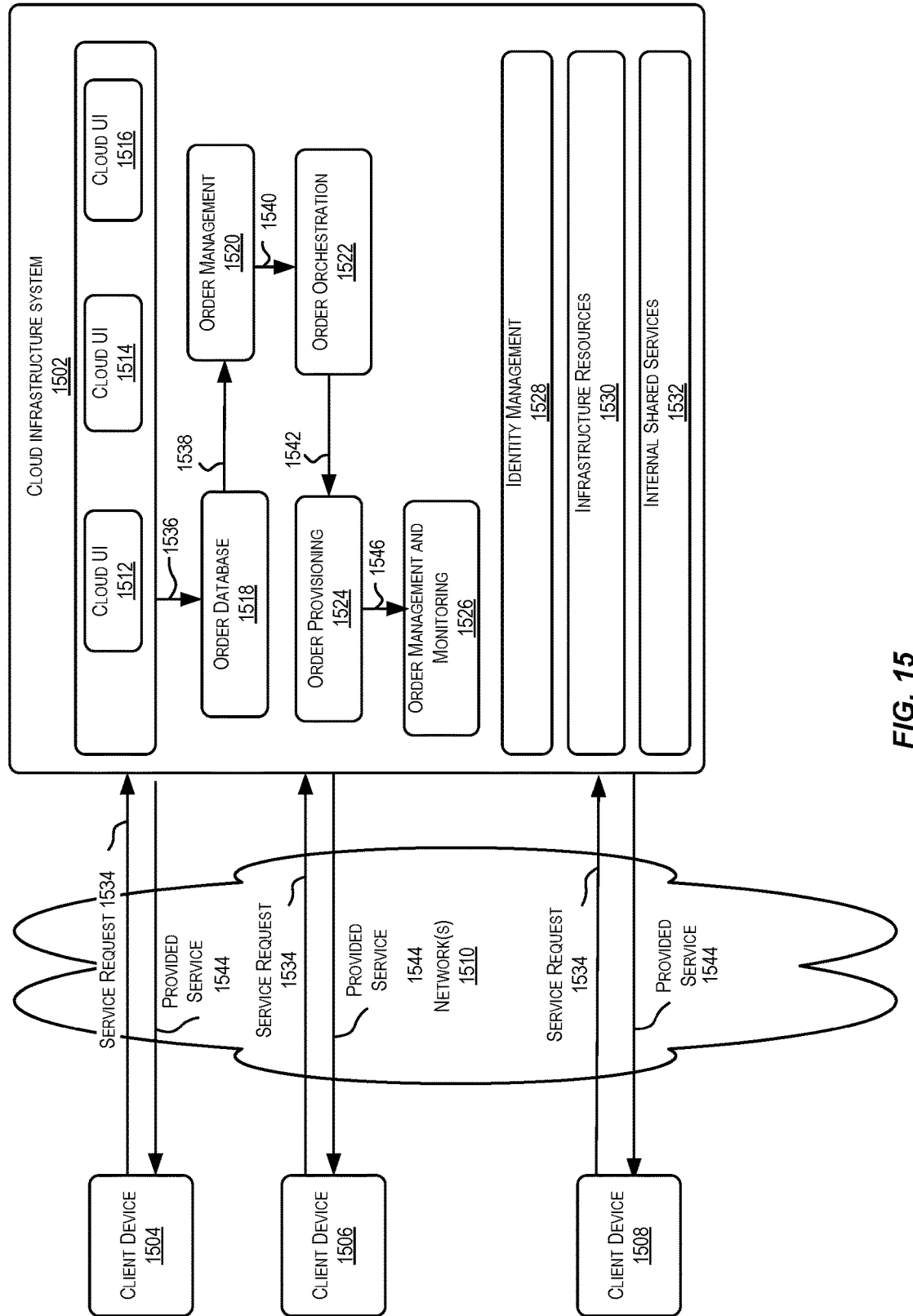
FIG. 15 is a simplified block diagram of components of a system environment by which services provided by the components of an aspect system may be offered as cloud services in accordance with an aspect.
Figure 16:
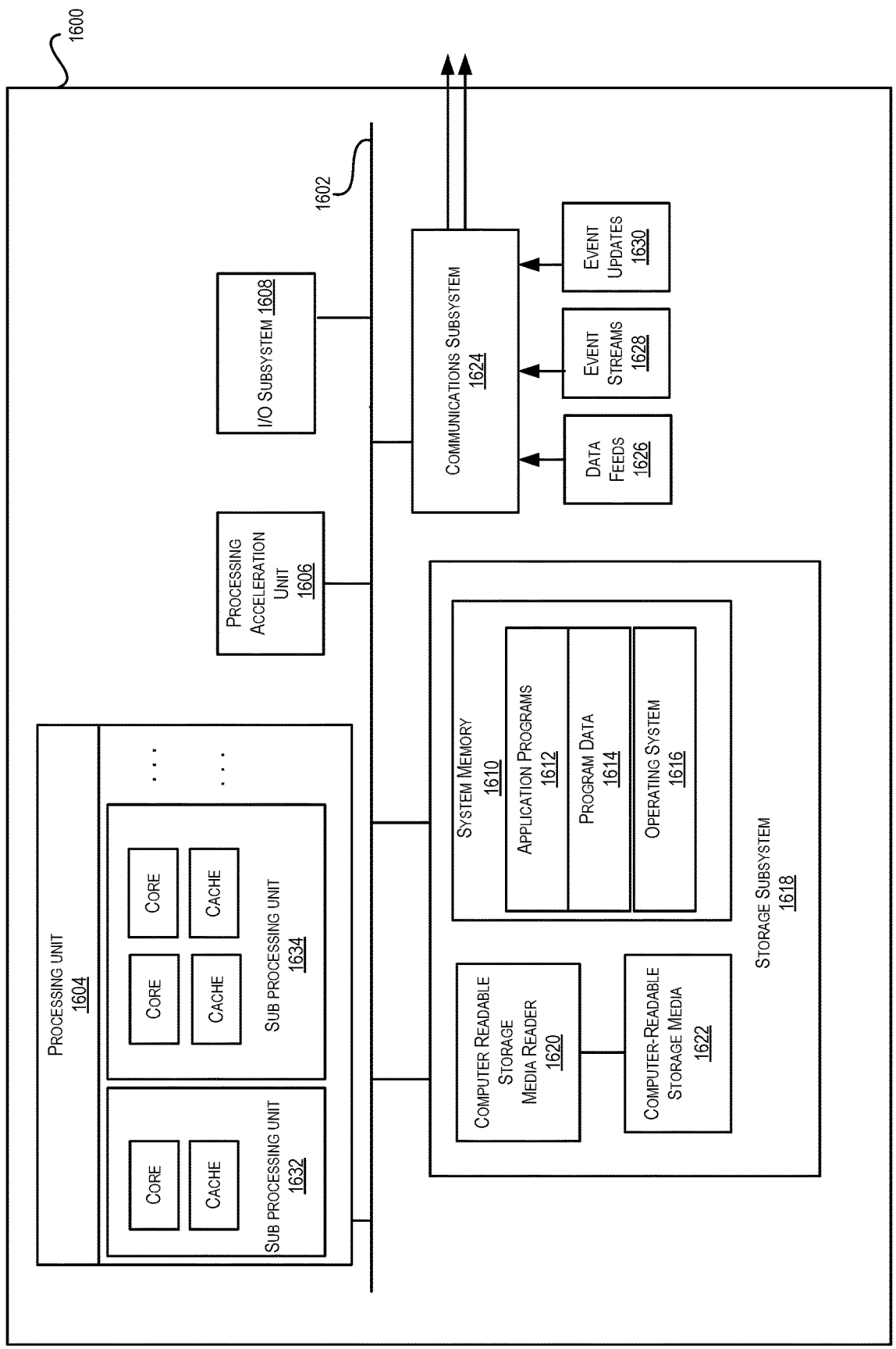
FIG. 16 illustrates an exemplary computing subsystem, in which various aspects of the present invention may be implemented.

Certain figures and associated description further explain certain aspects. For instance, FIGS. 4-5 relate to different aspects of span instrumentation. FIGS. 6-8 relate to prioritization of various spans during instrumentation. FIGS. 9 and 10 relate to instrumenting threads. FIGS. 11-13 relate to propagating span context across different devices. FIGS. 14-16 illustrate various computing systems which can implement instrumentation functionality.

Instrumentation of Web-Based Enterprise Applications

FIG. 2 depicts an example of a process 200 used to gather telemetry data, according to an aspect of the present disclosure. Process 200 can be performed by one or more of developer computing device 110 and servers 140a-n.

At block 202, process 200 involves providing a web page application to a web browser on a client device. For instance, server 140a serves web application 134 to web browser 132. Web application 134 includes tracer application 136, which provides instrumentation. Web application 134 instrumented with tracer application 136 prior to process 200.

At block 204, process 200 involves detecting a start of the web page application. Web browser 132 begins executing web application 134 and tracer application 136. Server 140a can detect the start of the execution by determining that web browser 132 has requested one or more resources.

At block 206, process 200 involves instantiating, based on a start of the web page application, the tracer application. Tracer application 136 is configured to log tracing data for web application 134.

At block 208, process 200 involves detecting an event initiated by interaction with the web page application. Web application 134 continues to execute and an event is triggered.

Examples of events include user interface interactions, clicks, navigations, mouse-overs, refreshes, etc. Additionally, an event can be representational state transfer (REST).

At block 210, process 200 involves automatically logging a start of a span based on the detection, the logging associating the span with the tracer application. Tracer application 136 causes the logging of a span that corresponds to the event.

At block 212, process 200 involves executing operations corresponding to the event. Web browser 132 executes code corresponding to the event, such as loading an image or resource.

At block 214, process 200 involves automatically logging an end of the span based upon a completion of the operations corresponding to the event. Upon the completion of the code referred to in block 212, tracer application 136 logs the end of the span. Data collected can include processing cycles used, time taken to execute the span, memory consumption, and so forth.

As discussed herein, certain aspects can measure data relating to a span that crosses multiple servers, processing threads, or uses multiple separately identifiable operations. For instance, an execution of block 210 can result in additional spans, each providing more granular information, being created. For instance, the tracer application 136 can create a first child span corresponding to a first operation and a second child span corresponding to a second operation. The first and second child spans can be children of the span.

Continuing the example, tracer application 136 automatically logs an end of the first child span based on completion of the first operation and automatically logs an end of the first child span based on completion of the first operation. Therefore, the tracer application 136 obtains more granular information than just the span alone. The first child span and the second child span are associated with the span.

An example below shows code for an insertion of a client-side span context using Javascript:

```
define(["@oracle/trace-client/trace",
    "@oracle/trace-client/trace_utils"],
    (Trace, TraceUtils) => {
    //Create a tracer
    const tracer = Trace.initTracer({
        url: getCollectorUrl( ) //Domain-specific
    });
    //Create a root span
    tracer.span({
        operationName: "rootSpan"
    }, (span) => {
        //Log a simple message
        rootSpan.info("Here's a message");
        //Log a message with custom fields
        rootSpan.info({messageStatus: 'lit'}, "This message is lit.");
        //Create a child span (if desired)
        tracer.span({
            operationName: "childSpan2",
        }, (childSpan) => {
        //Create a fetch request
        let request = new Request("http://.../myService/endpoint");
```

```
    //Inject the child span's context
    request = tracer.inject(childSpan, request);
    //Make the fetch call
    fetch(request).then((response) => {
        // ... process the response
        // Close the child span
        childSpan.finish( );
    });
}); // end child
    //Close up root span when we're done
    rootSpan.finish( );
}); //end root
}); //end process response
}); //end define
```

FIG. 3 depicts an example of an instrumented application for generating span context, according to certain aspects of the disclosure. The instrumented application can be built and instrumented by a software development tool such as developer IDE 112 and may be executed a browser executing on a computing device. FIG. 3 depicts web application environment 300, which includes web application 302, server 340, query 350, and a response 352. In the example depicted in FIG. 3, web application 302, which is instrumented with tracer capabilities executes on a web browser, communicating with server 340 to serve one or more web pages. Web application 302 sends one or more queries 350 and receives in response, one or more responses 352. While FIG. 3 is described with regard to a web page, it should be appreciated that the flow and components can be executed by a mobile application, or other application.

Web application 302 shows a flow 310, which includes web page 312 having components 314, 316, and 318. The components can be mobile applications, web applications, service connections, business objects, or processes. Each component can perform different functionality such as part of a web page. Each of components 314, 316, and 318 can cause component events 315, 317, and 318 respectively. Each of component events 315, 317, and 318 trigger one or more occurrences in the telemetry runtime 320, which in turn causes one more actions to be performed, while logging the events.

Modules of a flow 310 or a web page 312 may interact or relate to each other. For instance, for a particular web page, the components may be user interface (UI) components, variables, action chains, web page flows, and page navigation, and data access through REST endpoints. Variables can be a mechanism used to store and manage a state of the browser settings, client device settings, user settings or other parameters. The components of the web page can interact with a telemetry runtime that processes various events for each component.

The telemetry runtime 320 can generate actions or action changes that correspond to component events 315, 317, and 319. For example, a user may click on a particular visual element of the web page displayed within the browser, causing a component event. The telemetry runtime 320 may determine that the web browser should navigate to a new web page 330. The telemetry runtime 320 may determine that the action associated with the user click is to update a portion of a user interface (UI) of the web page 312.

In another example, the telemetry runtime 320 may initiate an action chain 333 that corresponds to the steps to update the portion of the UI. For instance, an action chain may be a set of one or more individual actions that are related or sequential actions 336. Each action chain can be triggered by an event. For example, a user click can trigger navigation to a page that corresponds to the location on the browser that the user click was received (e.g., a hyperlink, a navigation button, etc.). An action chain can define input parameters and local variables that are available within the scope of that action chain, and can include application-scoped parameters and variables. The telemetry runtime may determine that one or more REST calls 338 to the server are needed to update the portion of the UI.

In response to REST call 338, web application 302 sends a query 350 to the a REST service endpoint 332 of server 340. The query 350 can include an injection span context. In return, the server 340 sends back a response 352, which can include additional HTTP headers. The web application 302 then uses the response to complete the actions caused by the component event(s).

Flows of a web page and page navigation govern the communication of information between a first page to a second page. Each web page has a predefined lifecycle, as does each application that is running in the browser. Each lifecycle event, such as entry or exit from a page, can provide a trigger for an action chain. All data entering a mobile or web application may be based on REST protocols. This data can come from custom business objects and from business objects provided by service connections. Actions and variables control how data is sent to and from a REST endpoint in a mobile or web application. Action chains have a well-defined context and contract: an action chain orchestrates its underlying actions, coordinating state flow and the execution path. The action chain can define input parameters and local variables that are only available in that context. An example of an action chain is one that makes a REST call (first action), then takes the result of that and stores that in a variable (second action). Actions may export a new state to that context, but it is only available to future actions along that same action chain. An action chain can be created in the context of a page or the application and exists within the scope of the page or the application. It has a defined interface and contract and can be called by event triggers using its ID.

A telemetry Application Programmer Interface (API) 322 can enable programmer access to the activities of the telemetry runtime, any actions or action chains, component events, and other related activities (e.g., a server response to an action). The telemetry API 322 can output span logs to a database, storage medium, or another server or browser for additional processing. In one example, the telemetry API may be a REST API. The telemetry API 322 can store cloud infrastructure objects such as audit logs, application flow logs, or other log files. The telemetry API 322 may periodically sample the stored cloud infrastructure objects to output telemetry data to common analytics ingestion 324 or a client log ingestion endpoint 326.

Common analytics ingestion 324 may ingest log data from telemetry API 322. In one example, the common analytics ingestion 324 can ingest log data from cloud infrastructure object storage using a REST API. In one example, the common analytics ingestion 324 may determine storage locations for the collected log data. The common analytics ingestion 324 can ingest various log data at a user, group, or organization level. In some examples, common analytics ingestion 324 can transform the log data into a visualization for an analytics console.

A client log ingestion endpoint 326 can also be configured to receive log data from the telemetry API 322. The client log ingestion endpoint 326 can store log data, transform log data into various visualizations, or perform additional processing to log data.

Generally, distributed tracing may be implemented using a Trace-Client API within the distributed tracing architecture. The Trace-Client API consists of a tracer which is used to create spans around operations within an application. Spans can have child spans that indicate smaller granularity operations of the respective parent span, which can, in turn, have children that indicate smaller granularity operations than the first child span. A set of spans emanating from a single parent may be considered a trace. Spans contain metadata about the operation they are measuring, along with some identifying information. For applications with operations that make out-of-process calls (for example, a client application making a call to a REST service), span context can be propagated along with the outgoing request (for example, in the form of special HTTP headers). The receiving application or server can extract the span context and use it to create child spans of the parent span on the client. The Trace-Client API has the ability to output span information in the form of log messages (one each for the beginning and end of spans) to various backend servers.

An example of application spans is a simple application flow. For instance, a user navigates to a web page and click a button. The button click triggers an event, which causes the application to call an event handler. The event handler makes a REST (define) request, which is processed by a REST service. The service returns a response, which causes the user interface of the application to be updated. This example is illustrated in FIG. 4.

Figure 4:
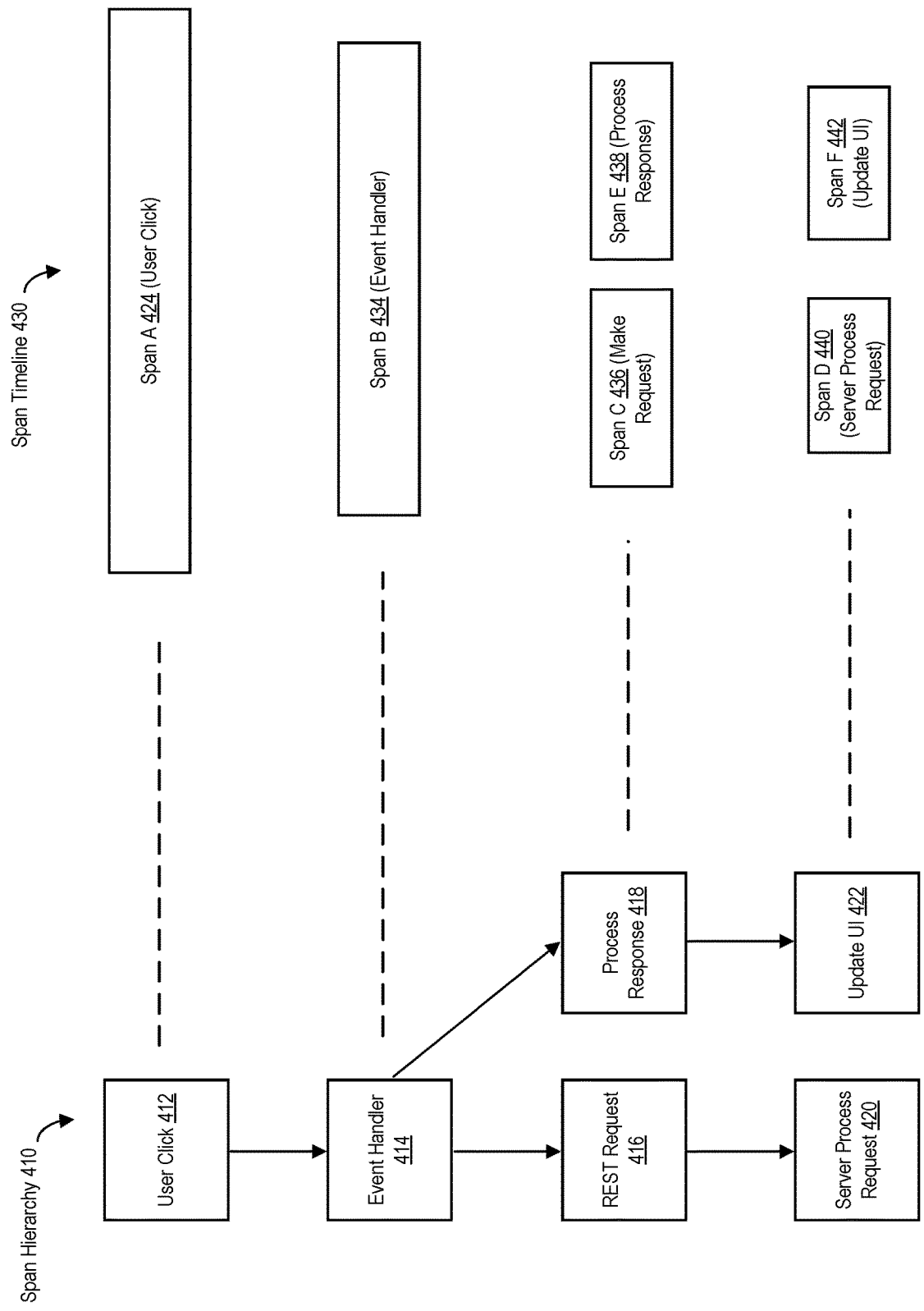
FIG. 4 depicts an example of a span hierarchy, according to an aspect of the present disclosure.

FIG. 4 depicts an example of a span hierarchy, according to an aspect of the present disclosure. FIG. 4 depicts a span hierarchy 410 and a span timeline 430. Together, span hierarchy 410 and a span timeline 430 describe a set of relationships between various spans in the span context. Within span hierarchy 410 or a span timeline 430, relationships exist between parent and child spans. As depicted, span hierarchy 410 represents a hierarchy of events such as user click 412, event handler 414, REST request 416, process response 418, server process request 420, and update UI 422. Span timeline 430 includes span A 424, span B 434, span C 436, span D 440, span E 438, and span F 442.

In an example, web browser 132 receives user click 412. User click 412 results in the creation of span A 424. In response, web browser 132 initiates an event represented by the action of the user click, which triggers the operation of event handler 414. The web browser 132 may use event handler 414 to determine one or more actions to take responsive to what event is detected based on the user click that was received. The instantiation of event handler 414 causes span B 434, which is a child span of span A 424.

Continuing the example, event handler 414 causes REST request 416 and process response 418. Because processing the response of the REST request occurs after the REST itself, span C 436 (corresponding to the REST request) occurs before span E 438. The REST request causes a server to process the request. The processing of the REST response causes the user interface (UI) to be updated accordingly. Therefore, as depicted, REST request 416 causes server process request and update UI 422. Because the UI is not updated until after the server processes the request, span D 440 (corresponding to server process request) starts and completes before span F 442 (corresponding to updating the UI). Therefore, span D 440 represents the server's processing of the request.

As can be seen, span D 440 occurs during span C 436 and span F 442 occurs during span E 438. Span E 438 represents the browser processing of a response from the server that corresponds to the REST request made from the browser. Span F 442 represents the browser updating the user interface based on the processing of the response from the server. Spans C 436 and E 438 are children of span B but execute sequentially. Span D 440 and F 442 are children of spans C 436 and E 438 respectively.

Span contexts such as those discussed with respect to FIG. 4 are managed by instrumentation libraries that are added to custom enterprise applications by a software development tool (e.g., developer IDE 112).

Figure 5:
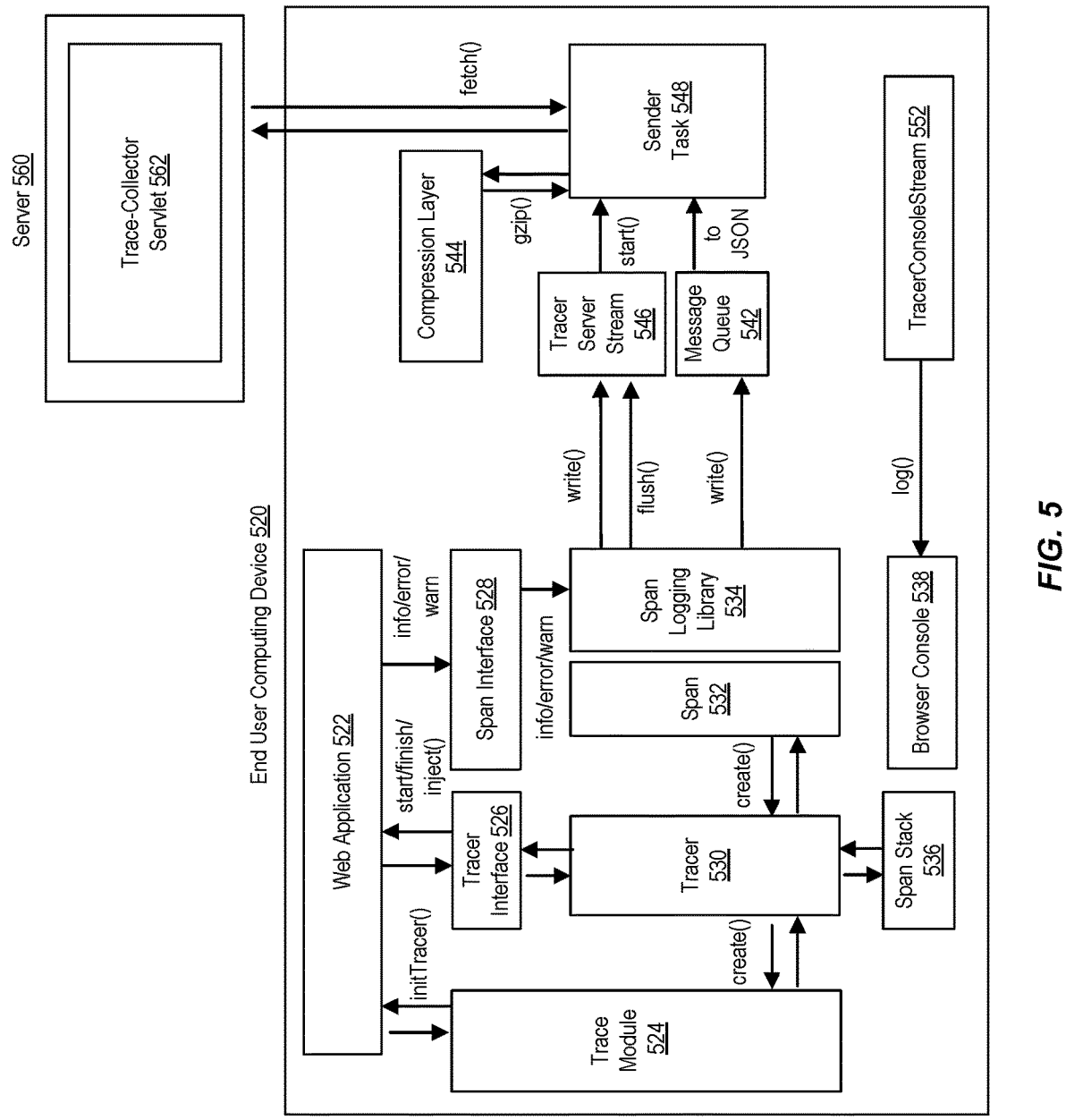
FIG. 5 depicts tracer components within an instrumented application that are used to generate span context and logs, according to certain aspects of the disclosure.
Figure 6:
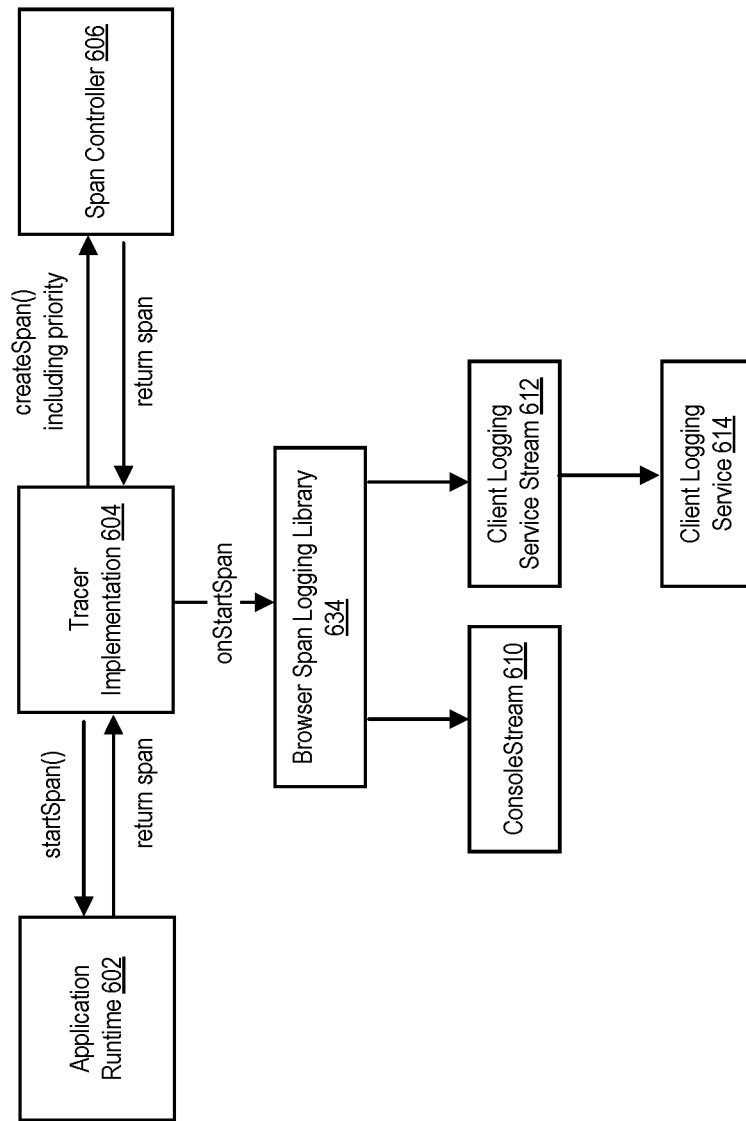
FIG. 6 depicts an example of a tracing architecture used to manage backpressure caused by instrumentation of spans, according to certain aspects of the disclosure.

FIG. 5 depicts tracer components within an instrumented application that are used to generate span context and logs, according to certain aspects of the disclosure. In the example depicted in FIG. 5, end user computing device 520, which executes web application 522, communicates with server 560 via various commands and/or API calls. Web application 522 can be developed by developer IDE 112 and can be customer-developed software. Code to support instrumentation is automatically added by developer IDE 112.

End user computing device 520 includes one or more modules such as web application 522 (or any other consuming client), trace module 524, tracer interface 526, span interface 528, tracer 530, span 532, a span logging library 534 (i.e., a Bunyan Logger), span stack 536, browser console 538, compression layer 544, tracer server stream 546, sender task 548, message queue 542, and tracer console stream 552. In turn, tracer 530 operates to perform instrumentation on web application and creates one or more spans 532 and adds active spans to span stack 536. Server 560 includes one or more modules such as a trace-collector servlet 562.

Subsequently, web application 522 receives or detects interactions from the user (e.g., a user click). Web application 522 interacts with trace module 524 and/or tracer interface 526 to start one or more tracers 530. In turn, span logging library 534 logs information and metadata such as an event type, name of the event, URL of a server request, status code of the return value, errors, warnings, and so forth via span interface 528.

Various API calls are available. The API call initTracer( ) initializes and returns a global tracer object. The API call initTracer is called once for an application context and returns a TracerOptions object. The API call activeTracer returns the global tracer object. For example, The API call inject( ) causes a span to be injected into a request (e.g., to a server). Upon return the API call extract( ) can be used to extract a span.

Multiple spans can be generated. For instance, tracer 530 can create a span to represent an event or a thread of the web application 522. Tracer 530 can create child spans as appropriate (e.g., as described with regard to FIG. 4) based on the particular operation for which the tracer created the span. As discussed further herein, instrumented applications can obtain information from different threads and/or different servers that service requests caused by the triggering of events in the application.

Web application 522 may use tracer interface 526 to control the tracer or receive injections for the span. The tracer may also monitor, write, or read to span stack 536 where one or more spans can be cached or accessed by the tracer to monitor parent spans, or insert span context within a newly created span such as span 532. Web application 522 may use span interface 528 to communicate span related information to a span logging library 534. Compression layer 544 can compress span related information minimization before it is sent to the trace-collector servlet 562. Examples of compression techniques used by compression layer 544 include zip and gzip. In one example, the tracer console stream 552 may output a stream of the span log to a browser console presented on the end user computing device 140. In turn, server 560 may execute a trace-collector servlet 562, which stream of span logs and collects traces from sender task 548 on end user computing device 520.

Prioritization of Spans

Aspects of the present disclosure relate to instrumenting web applications. In some cases, due to a high number of events and resulting spans and/or calls resulting in child spans, a number of spans can become difficult to manage or prioritize. In such cases, certain aspects provide features for reducing the payloads of spans for the purpose of reducing capacity for span logs and streamlining telemetry data.

In a default mode, the instrumentation can to capture all spans and emit messages based on all of the spans to the browser console and any services. However in some cases, an unmanageable number of span messages may be present, obfuscating a clear picture of relevant telemetry data of interest. Therefore, spans can be filtered based on one or more criteria.

Further, in some cases, a span of interest is a child span, providing more detailed information than a corresponding parent span. But the parent span information may be contributing to a congestion of span data. Accordingly, certain aspects introduce the concept of proxy spans allow for maintaining a span tree while only gathering instrumentation details for one or more specific child spans of interest.

FIG. 6 depicts an example of a tracing architecture used to manage backpressure caused by instrumentation of spans, according to certain aspects of the disclosure. FIG. 6 depicts tracing architecture 600, which includes one or more of application runtime 602, tracer implementation 604, span controller 606, browser span logging library 634, console stream 610, client logging service (CLS) stream 612, and client logging service 614. In the example depicted, span controller 606 manages and prioritizes spans based on one or more parameters. Application runtime 602 may be similar to the telemetry runtime 320 and perform operations similar to telemetry runtime 320 described with regards to FIG. 3.

In a first example, a tracer implementation 604 starts spans for application runtime 602. The tracer implementation 604 may concurrently communicate span monitoring data to browser span logging library 634 while executing spans. The browser span logging library 634 outputs the span log data to console stream 610, which may be presented within the browser of an end user device. The browser span logging library 634 can also output the span log data to the CLS stream 612. The CLS stream 612 may be a stream of log data communicated to the client logging service 614. The client logging service 614 may store the log data for additional processing.

In another example, the tracer implementation 604 receives spans that are created by span controller 606. The tracer implementation 604 can also return spans (e.g., terminate a span) upon completion of the event for which the span was generated. The tracer implementation 604 may also receive a command to terminate the span from the application runtime 602. Span controller 606 can implement span prioritization. Each span can have a priority level. For instance, span controller 606 can receive one or more parameters indicating which span(s) to prioritize. In an example, a default span priority is set. If a priority level of a given span is less than a default priority, then data for the span and associated child spans is not returned.

In yet another example, tracing architecture 600 provides for an initial set of spans to be generated, for instance, as discussed with respect to process 200. Each span in the initial set of spans can be given a corresponding priority. Subsequently, at runtime, spans in the initial set of spans can be measured or not measured, or pruned to a subset, based on programmer or user input. For instance, a threshold priority can be set. At runtime, any span that has a priority greater than the threshold priority is converted into a proxy span and is not measured.

A proxy span maintains the span tree, that is the relationships between parent and child spans. But because proxy spans are not measured, span controller 606 does not obtain runtime instrumentation measurements for the spans, but still obtains measurements for any child spans that are not proxy spans. The span proxy preserves the relationship between parent and child and therefore maintains the tree structure, even if certain proxy spans in the tree do not have instrumentation data. Hence, in a way, the span tree is pruned such that the data for the spans that are interesting to a developer are maintained. FIG. 7 provides an example of using proxy spans.

FIG. 7 depicts examples of a span hierarchy without span prioritization and a span hierarchy with prioritization, according to certain aspects of the disclosure. In particular, FIG. 7 depicts span hierarchy 700, which does not use prioritization, and a span hierarchy 730, which uses prioritization.

In span hierarchy 700, span A 702 is a parent span of span B 704. In turn, span B 704 is a parent span of span C 706, span D 708, and span E 710. In span hierarchy 700, data for all spans, span A 702, span B 704, span C 706, span D 708, and span E 710 is gathered.

In span hierarchy 730, by contrast, illustrates a hierarchy with span prioritization. Span hierarchy 730 includes span A 732 and span proxy B 734, which is a child of span A 732. Span A 732 has a priority of 1. Span proxy B 734 has a priority of 2, which is greater than the priority of span A 732. In this example, the default priority is set to be 1. Span proxy B 734 has been converted from an original span B because instrumentation data from span B was not needed as indicated by the priority of span B being 2, which is greater than the default priority.

As a consequence, span C 736, span D 738, and span E 740, all of which have priority of 1 and are therefore not pruned, are marked as having parent span A 732 because their original parent, span B, was proxied. Accordingly, at runtime, instrumentation data is gathered for span A 732, span proxy B 734, span D 738, and span E 740.

From an implementation perspective, a SpanOptions object used for creating spans contains a priority field. In some cases, an absence of priority on a span indicates an implicit priority of "high" (1) for root spans and "medium" (2) for child spans. A span (identified by SpanImpl) is created and returned and messages are emitted normally. If a span has been proxied, then a SpanProxy object is created instead. The SpanProxy object can be interacted with like any other Span object, but the fields and methods of SpanProxy will delegate to the active span. For instance, in the example above, span proxy B 734 corresponds to an object SpanProxy and the methods and fields therein will default to those corresponding to the object of Span A 732. In this manner, the application runtime environment need not be adjusted because as far as the application is concerned it is always receiving a span.

In some implementations, a priority value is represented by a positive number, with a higher value indicating a lower priority. For instance, priority level 0 can be the highest priority, then level 1, then level 2, and so forth. Therefore, in this implementation, any spans with priorities higher in value than the threshold priority are converted into proxy spans. But a different numbering scheme is possible, e.g., higher value indicating higher priority. In some cases the priority is represented aliases, for instance "critical" is assigned to level zero, "high" to level 1, "medium" to level 2, and "low" to level 3. By default, root spans can have a priority of 1, and child spans have a priority of 2.

In some cases, a priority threshold can be modified by a fleetwide sampling algorithm. This algorithm requires that each priority be assigned a percentage and a random number selected to fall into one of the percentages. Higher percentages will be typically be assigned to higher priorities, to ensure that most users of the application emit the minimum amount of telemetry (for capacity and performance reasons). A smaller percentage might be assigned to lower priorities, indicating that a smaller number of users will emit more telemetry, in order to get deeper information on user journeys or other higher granularity information. The percentages can be applied on the tracer configuration, or by a server-side profile option.

In some cases, priority boosting can occur. Priority boosting refers to increasing the priority of a proxied span at runtime. This can occur if the span turns out to have interesting instrumentation data. Examples of priority boosting include when duration is taking too long and the span does not have children that would form the majority of the duration of the span or if an error occurs.

The tracer system can be configured to adjust the priority threshold dynamically, for instance if too requests are received and/or a payload is too large (also referred to as "ingestion service backpressure"). For instance, the ingestion service (CLS) that collects the spans and logs can respond with an HTTP error code (for example, "429 Too Many Requests" or "413 Payload Too Large") that indicates too many spans and/or logs have been sent. The system can then respond by dynamically altering the priority threshold so that fewer logs are sent in subsequent requests.

The following table illustrates example priorities of spans for different events:

TABLE 1

Examples of priorities for different spans

| Span Operation Name | Priority |
|---|---|
| pageLoad | 1 |
| componentEvent (ie. user events) | 1 |
| runtimeEvent (ie. enter/exit) | 1 |
| variableEvent | 2 |
| fetch | 1 |
| sdp.fetch | 2 |
| fetchFirst, fetchNext | 2 |
| action | 2 |
| actionChain | 2 |
| spans for unhandled exceptions | 1 |
| componentEvent with container.event='onFndNotificationPoll' | 3 |
| pageLoad with container.id='shell' | 3 |
| runtimeEvent with container.event !='vbExit' or 'vbEnter' | 3 |

FIG. 8 depicts an example of a process 800 for prioritizing spans, according to certain aspects of the disclosure. Process 800 can be performed by one or more of developer computing device 110 and servers 140a-n.

At block 802, process 800 involves identifying, from code of a web application, that the web application includes an event that is triggered by a user interaction. For instance, during instrumentation, developer IDE 112 executing on developer computing device 110 determines that web application 134 includes an event that is triggered by a user interaction.

At block 804, process 800 involves associating the event with a first span. Developer IDE 112 configures the tracer to log tracing information based on an execution of a first set of operations caused by (corresponding to execution of) the event. The tracer is configured to obtain a first measurement of performance of a first span. The span refers to the first set of operations. Examples of measurements of performance include cycles, processing time, memory usage, latency, etc.

At block 806, process 800 involves identifying, in the code, that the execution of the first set of operations causes a request to be made to a server. For instance, the first set of operations can involve a REST call.

At block 808, process 800 involves associating the request with a second span. Based on the identified request, the tracer is configured to log tracing information based on an execution of a second set of operations caused by the request. The tracer is configured to obtain a second measurement of performance of the second span. The second span is a child span of the first span.

At block 810, process 800 involves receiving a priority for the first span. For example, at runtime when the web browser 132 is executing web application 134, a developer can adjust the priority for the first span. The priority can be adjusted upward or downward.

At block 812, process 800 involves determining that the priority is outside a priority tolerance. In some cases, a threshold value can be used instead of a tolerance.

At block 814, process 800 involves labeling the first span as a proxy span based on the determining. Continuing the example, the web browser 132 labels the first span as proxy span such that instrumentation data is not gathered. At runtime, when the web application is executing, the tracer does not log information based on the execution of the first set of operations that correspond to the first span.

Instrumenting Threads

Traditionally, web-based applications can use a main browser thread for user interface operations. For instance, improvements to asynchronous Javascript programming have made the main browser thread a viable way of creating applications that are responsive. But for certain long-running background processes, an application developer would may choose to use of the Web Worker API, which allows for creating actual native threads for executing application logic.

However, in a standard distributed tracing application, a separate thread (such as via the Worker API) is considered out of process or at least on a different scope than a tracer that is executing on the main thread. Consequently, a tracer needs to be configured within the code to operate on the worker thread.

By contrast, certain aspects can automatically instrument threads. For instance, a TraceWorker class abstracts the work of configuring a Tracer in application code by encapsulating it in a subclass of a standard Worker class. The TraceWorker class uses an algorithm to automatically create the Worker thread, configure a Tracer, and then load the application code which will then automatically be telemetry-enabled. The TraceWorker can then optionally be configured to override the native Web Worker API so that anytime the application attempts to create a Worker thread it will be a TraceWorker which is wrapping a standard Worker's functionality.

Advantages to this approach include transparent operation to the developer and user and enabling telemetry for outof-thread code while preserving span hierarchy between threads. Additionally, no requirement exists for duplicate configuration data because configuration data for each thread will inherit the main thread's configuration automatically.

FIG. 9 depicts an example of a distributing tracing environment with a traceworker client, according to certain aspects of the disclosure. FIG. 9 depicts main browser thread 910 and worker thread 920. In the example depicted in FIG. 9, main browser thread 910 calls worker thread 920, which provides instrumentation data back to main browser thread 910.

Main browser thread 910 includes main application 912, tracer 914, and TraceWorker client 917. Worker thread 920 includes TraceWorker shim code 922, application worker script 924, and tracer 925. Worker thread 920 is an object that is created using TraceWorker client 917 and can be written in JavaScript.

The worker thread 920 can run in a context that is different from the main browser operations such as the browser window. In this manner, a more responsive user interface can be maintained, for instance, if the tasks to be performed by the worker thread 920 are time consuming or complex.

TraceWorker client 917 can manage threads such as worker thread 920, such as by configuring worker thread 920 using traceworker shim code 922. Adding the traceworker shim code 922 facilitates obtaining span context and trace context. The constructor of the wrapper will be wrapped with a span, which will be a child of a current span's context if applicable. Worker threads are initialized with an application script that runs upon creation and have a communication port.

The TraceWorker client 917 generates and executes shim code 922 that performs the following actions: (1) temporarily installs message handlers to handle all incoming messages from the main thread, (2) loads all distributed tracing dependencies, and (3) replies with a message indicating success (or failure).

If successful, the TraceWorker client 917 will get the active span context and Tracer configuration, and send to the shim. The shim will receive the Tracer configuration, initialize a Tracer, and create a child span of the received span context. The shim will then inject the application worker code and remove its message handlers. In turn the application and worker threads perform various operations.

Once created, the worker thread 920 may create a tracer and copy one or more configuration parameters from the worker thread 920 to the tracer 925. The worker thread 920 may also extract the span context associated with the span created by main application 912. The worker thread 920 may create a child span of the span created by main application 912 including the span context. During execution of the application worker script 924 by the worker thread 920, child spans may be created and captured by the tracer 925 for further processing. The worker thread 920 may communicate that the application worker script 924 has been completed successfully to the TraceWorker client 917. The TraceWorker client 917 may subsequently communicate to the main application 912 that the worker thread was successful. The main application 912 may communicate to the tracer 914 that the span is completed and terminate the span.

In one example, data can be sent between worker threads and the main application via a system of messages in which both sides send their messages. The messages may be sent using a method such as postMessage( ), and respond to received messages may be communicated using an on message event handler such that the message is contained within the message event's data property. In this particular configuration, the message data is copied rather than shared between the main application and worker threads. Worker threads may spawn subsidiary workers (e.g., subsidiary threads) where workers are hosted within the same origin as the parent page.

The following example code illustrates how a developer may use the TraceWorker thread:

```
// import the Trace-Client API
require(['trace', 'trace/util/worker_utils'], (Trace, WorkerUtils) => {
    // Assumes a Tracer was initialized
    // (Note that Visual Builder applications wouldn't require tracer creation)
    const tracer = Trace.initTracer({...});
    let workerSpan = tracer.startSpan({
        operationName: 'workerSpan'
    });
    // Option 1. Create the worker
    const worker = new WorkerUtils.TraceWorker(['my_worker_script.js',
    'my_referenced_script.js'], /* other Worker options */);
    // Or Option 2. Use optionally overriden window.Worker API
    // const worker new = window.Worker(['my_worker_script.js',
    'my_referenced_script.js'], /* other Worker options */);
    // ... install a message handler per normal Worker thread usage
    worker.oncomplete = (msg) => {
        // Once worker is done, finish the span, and that's it.
        workerSpan.finish( );
    };
    // Current tracer config and span context is automatically injected before
    app scripts
    are run
    worker.run( );
});
```

FIG. 10 depicts an example of a process 1000 for instrumenting threads, according to certain aspects of the disclosure. Process 1000 can be performed by one or more of developer computing device 110 and servers 140a-n.

At block 1002, process 1000 involves providing a web page application to a web browser on a client device. For instance, server 140a provides web application 134 to web browser 132 on end user computing device 130.

At block 1004, process 1000 involves creating, from the web page application, a global tracer configured to log tracing data for the web page application. Similar to as described with respect to block 206 of process 200, a global tracer is created.

At block 1006, process 1000 involves instantiating, from the web page application, a wrapper for a subsidiary thread. The wrapper is configured to execute shim code before executing the subsidiary thread.

At block 1008, process 1000 involves passing, from the wrapper to the shim code, configuration data of the global tracer.

At block 1010, process 1000 involves creating a subsidiary tracer from the shim code. The subsidiary tracer is configured to log tracing data for the subsidiary thread. The tracing data of the web page application and the subsidiary thread are associated through the configuration data of the global tracer.

At block 1012, process 1000 involves executing, from the shim code, the subsidiary thread.

Instrumenting Spans Across Server Calls

FIG. 11 depicts an example of a process 1100 for propagating tracing across a distributed software application, according to certain aspects of the disclosure. Process 1100 can be implemented by a computing system such as the end user computing device 140 and can be part of the tracer application 136. Process 1100 involves creating an appropriate request for a remote server to obtain a resource (e.g., web page, image, or file). The request can be in hypertext transfer protocol (HTTP). For illustrative purposes, process 1100 is discussed in conjunction with FIG. 12.

FIG. 12 depicts an example of propagating span context across a services in a distributed system, according to certain aspects of the disclosure. Examples of services include REST calls to servers. For example, rendering a particular web page may require multiple REST calls, each with a specific purpose. A first REST call may cause the web browser to render the page, a second REST call may obtain an image that is located on a server (the REST endpoint) to be displayed on the page, or a third REST call may be a database query to obtain some information such as an employee's manager's name. A REST call can also cause one or more child REST calls to execute.

REST calls can be cross-origin calls. Cross origin calls request information from a server that is not the original server (e.g., the server that serves the web page). For example, the original server can be on oracle.com, whereas the second server can be on google.com. In some cases, process 1100 is executed after determining that the web page from the original server requires a request to an external server outside a domain of the original server. The determining can be compatible with cross-origin resource sharing (CORS).

FIG. 12 includes service 1210 and service 1220. Service 1210 can execute the browser and service 1220 executes on a server identified by the REST endpoint. Service 1210 includes parent span 1212, child span 1214, and child span 1216. Service 1220 includes child span 1222, which is after the REST call. In an example, child span 1214 and 1216 represent processing that needed to happen before the REST call and the context of child span 1222 is sent over the network to the server. In turn, the server can propagate its span context to another server if it makes such a request. Each server collects its respective traces and sends them to the appropriate location.

As discussed, the span context includes a root span or trace identifier, which indicates an overall objective trying to be accomplished (e.g., load the page). The complete span context includes a trace identifier (ID) that is typically a 128-bit representation and child ID that is typically a 64-bit random number. From each span context, a graph can be constructed from each all of the span contexts that point to their respective parents.

Returning to FIG. 11, at block 1101, process 1100 starts. Tracer application 136 can log tracing data for a web page from an original server. The tracing data can include previous requests and their successes and failures. From the tracing data, tracer application 136 can form a deny list that includes destination servers that did not accept requests with tracing headers and/or an allow list that includes destination servers that did accept requests with tracing headers. In some cases, process 1100 executes if a cross-domain request is detected.

Instrumentation can be achieved via injecting tracing headers into requests to servers for resources (e.g., as part of a web page loading). But tracing headers can often be rejected, for example, for security reasons. Accordingly, process 1100 involves working around such security measures to facilitate telemetry. For example, considering FIG. 12, service 1210 executes on the original server and service 1220 on the external server. Parent span 1212 (e.g. for a first process) therefore executes on the original server. Using techniques disclosed herein, tracer application 136 can analyze not only parent span 1212, but also child span 1214 and child span 1216, derived from child span 1214. But as can be seen, parent span 1212 is also related to child span 1222, which executes on service 1220 (therefore on the external server). Process 1100 can be used to propagate the span context from parent span 1212 to child span 1222, thereby facilitating instrumentation.

At block 1102, process 1100 involves determining whether CORS is active (e.g., a cross-domain request is detected). If CORS is active, then process 1100 proceeds to block 1103. In this case, then if CORS is not needed, then process 1100 proceeds to block 1108, where a header is injected.

At block 1103, process 1100 involves determining whether the request for the resource is idempotent. Idempotent means that an intended effect on the server of multiple identical requests with that method is the same as the effect for a single such request. Accordingly, if the intended effect on the server of the request is not idempotent, i.e., will not have the same as a previous request, then process 1100 proceeds to block 1104. Otherwise, if the request is idempotent, process 1100 proceeds to block 1115.

At block 1104, process 1100 involves determining whether the destination of the request is on a server deny list. For example, tracer application 136 searches a deny list for whether the external server disallows tracing headers in requests from the original server. The server deny list includes servers that are identified as denying requests that include extra headers (e.g., as created by requests identified by block 1112 of process 1100). The deny server list is useful because given a choice between having the REST call fail and simply not having the telemetry information, simply not having the telemetry information is preferable.

If a request to a service does not support propagation headers, the request is added to a deny-list, which will prevent any further automatic attempts to inject context for this user session, and perform the request without injected headers. In an aspect, the deny-list is not cached in local storage, so that an incomplete configuration does not cause a block of future requests. An destination can be on both allow and deny lists, but if so, the deny-list will take precedence.

Allow-lists and deny-lists are implemented as associative arrays to improve lookup time. The lists are keyed by the URL origin of the failed request (without any parameters) or the individual service. This might be determined by the configuration of the request. The value of the map can be null but might later include the actual failure or other metadata about the reason for being added to the list.

Examples of calls include:

{ 'http://example.com/': null, // allow-deny whole origin

'http://someurl.com/myservice': 'additional metadata' , // allow-deny individual service }

If the server is deny listed, then process 1100 proceeds to block 1114. If the server is not deny listed, then process 1100 moves to block 1105.

At block 1105, process 1100 involves determining whether the destination of the request is a server on an allow list. For example, tracer application 136 searches an allow list for whether the external server allows tracing headers in requests from the original server. The allow list includes servers that are identified as accepting requests with extra headers (e.g., as created by requests in block 1112 of process 1100).

Once the propagation headers are determined to be supported, the particular destination is added to the allow-list. The allow list can be cached in local storage so that no additional OPTIONS calls will need to be made. This approach removes a need for user interface support to explicitly allow-list service endpoints. If the destination is on the allow list then process 1100 continues to inject headers at block 1108. If the destination is not on the allow list then, process 1100 continues to block 1106.

At block 1106, process 1100 involves performing an HTTP OPTIONS call. An OPTIONS call requests permitted communication options from a server. Under the CORS protocol, a preflight request is sent with the OPTIONS method so that the server can respond if it is acceptable to send the request. The OPTIONS call results in a determination of whether injecting tracing headers would be accepted or not. In some cases, at block 1106, process 1100 involves performing a preflight request before the browser has automatically performed such a check. Process 1100 continues to block 1107.

At block 1107, process 1100 involves determining from the result of the OPTIONS call, whether tracing headers will be supported by the server. In some cases, the OPTIONS call can send back a list of permissible (or accepted) headers. If tracing headers are supported, then process 1100 moves to block 1108, where headers are injected. If tracing headers are not supported, then process 1100 moves to block 1113, where the server is added to the server deny list.

Below are some sample OPTIONS requests/responses (note that some headers have been omitted for brevity). For instance, an OPTIONS request detecting propagation is shown:
OPTIONS/myendpoint/myservice HTTP/1.1 Host: bar.other
Origin: http://foo.example
Access-Control-Request-Method: POST
Access-Control-Request-Headers: Content-Type, x-b3-trace-id, x-b3-span-id, x-b3-parentspanid, x-b3-sampled, ecid-context In another example, a response when a service endpoint configured for propagation is shown:
HTTP/1.1 204 No Content
Access-Control-Allow-Origin: https://foo.example
Access-Control-Allow-Methods: POST, GET, OPTIONS
Access-Control-Allow-Headers: Content-Type, x-b3-trace-id, x-b3-span-id, x-b3-parentspanid, x-b3-sampled, ecid-context Access-Control-Max-Age: 86400

In another example, a response with no propagation configured is shown:
HTTP/1.1 204 No Content
Access-Control-Allow-Origin: https://foo.example
Access-Control-Allow-Methods: POST, GET, OPTIONS
Access-Control-Allow-Headers:
Content-Type Access-Control-Max-Age: 86400

At block 1108, process 1100 involves injecting headers into the request. The injecting a tracing header in the request is based on a result of a determination that the external server allows tracing headers in the request. Examples of the contents of tracing headers include a span context.

In an example, two sets of headers are injected into outgoing requests using Zipkin and/or Execution Context (ECID). These protocols provide coverage for preserving context with with minimal work on the side of the service developers.

In an example, the Zipkin B3 HTTP header scheme is used due to its wide support. Examples of B3 headers include:
x-b3-traceid: {TraceId}
x-b3-parentspanid: {ParentSpanId}
x-b3-spanId: {SpanId}
x-b3-sampled: {Sampled}

TraceId is a unique 32-character UUID string, SpanId is a unique 16 character string indicating the enclosing span, ParentSpanId is the unique id of the span's parent (if applicable), and Sampled is a flag indicating whether to report span telemetry.

In another example, an Oracle-specific ECID-Context header is used:
ECID-Context: 1. {TraceId}@@{SpanId};<RID>

RID is an encoded string of bytes that indicates the path of the context; from the browser this string will be "kXjE" which when decoded indicates the root of a request.

Once it is determined that headers can be injected, the injection is performed with the Tracer.inject( ) API call. This call injects the HTTP headers into the outgoing request before it is sent to the server.

FIG. 13 depicts an example of headers, according to certain aspects of the disclosure. FIG. 13 depicts headers 1310, which are the HTTP headers without the instrumentation and headers 1320, which are the same HTTP headers as headers 1310 but with the added instrumentation (shown in bold text).

Returning to FIG. 11, process 1100 continues to block 1109.

At block 1109, process 1100 involves making the request to the server. The web browser sends the request with the tracing header to the external header. The external server is configured to log tracing data based on the tracing header.

At block 1110, process 1100 involves determining whether the request to the server was successful. If the request was successful, then process 1100 moves to block 1111, at which the process ends. If the request was not successful, then process 1100 moves to block 1112.

At block 1111, process 1100 involves ending the process for the request. At block 1111, the extra header is successfully sent to the server, which results in the span context being propagated to the destination server, which then assists with the instrumentation.

At block 1112, process 1100 involves determining whether the failure identified at block 1110 was due to the headers as opposed to some other error. If the failure was not due to the headers, then process 1100 moves to block 1116, during which normal failover/retry procedures can be performed. If the failure was due to the headers, then process 1100 moves to block 1113 and adds the server to the server deny list.

At block 1113, process 1100 involves adding the destination server to the server deny list. In this manner, if a request is identified that has the same destination server, then process 1100 does not attempt to send a request with a tracing header to the same server which denied it. After completion of block 1113, process 1100 moves to block 1114, where an uninjected request is made.

At block 1114, process 1100 involves making an uninjected request, e.g., a normal REST call without the tracing header. In some cases, timing the time for the request to be handled can be used for the telemetry. After block 1114, process 1100 continues to block 1118, which involves handling the response normally.

At block 1115, process 1100 involves determining whether the request is in the cached request list. A request may be stored in a cache to improve performance and reduce failure. If the request is cached, then process 1100 proceeds to block 1117. If the request is not cached, then process 1100 proceeds to block 1104. The request can include the span context.

At block 1116, process 1100 involves performing a failover process or retrying the request. In this case, given that having a page fail to load or complete is a less than optimal user experience, at block 1116, process 1100 involves retrying the failed operations to ensure that the tracing header injection attempts have not caused a failure. In some cases, developers may have not added sufficient error checking or graceful exits. Therefore, in this respect, block 1116 helps ensure that a custom application does not fail due to the telemetry. The request can include the span context.

At block 1117, process 1100 involves proceeding with the cached response. The cached response is used to service the request. The request can include the span context. The spans and the logs are sent to the span logging library as discussed with respect to FIGS. 4 and 5.

FIG. 14 depicts a simplified diagram of a distributed system 1400 for implementing one of the aspects. In the illustrated aspect, distributed system 1400 includes one or more client computing devices 1402, 1404, 1406, and 1408, which are configured to execute and operate a client application such as a web browser, proprietary client (e.g., Oracle Forms), or the like over one or more network(s) 1410. Server 1412 may be communicatively coupled with client computing devices 1402, 1404, 1406, and 1408 via network(s) 1410.

In various aspects, server 1412 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (4D) representations, page-based logical environments, or otherwise. In some aspects, these services may be offered as web-based or cloud services or under a Software as a Service (SaaS) model to the users of client computing devices 1402, 1404, 1406, and/or 1408. Users operating client computing devices 1402, 1404, 1406, and/or 1408 may in turn utilize one or more client applications to interact with server 1412 to utilize the services provided by these components.

In the configuration depicted in the figure, the software components 1418, 1420 and 1422 of distributed system 1400 are shown as being implemented on server 1412. In other aspects, one or more of the components of distributed system 1400 and/or the services provided by these components may also be implemented by one or more of the client computing devices 1402, 1404, 1406, and/or 1408. Users operating the client computing devices may then utilize one or more client applications to use the services provided by these components. These components may be implemented in hardware, firmware, software, or combinations thereof. It should be appreciated that various different system configurations are possible, which may be different from distributed system 1400. The aspect shown in the figure is thus one example of a distributed system for implementing an aspect system and is not intended to be limiting.

Client computing devices 1402, 1404, 1406, and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 15, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1402, 1404, 1406, and 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although distributed system 1400 is shown with four client computing devices, any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.14 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1412 can include one or more virtual machines running virtual operating systems, or other computing architectures involving virtualization. One or more flexible pools of logical storage devices can be virtualized to maintain virtual storage devices for the server. Virtual networks can be controlled by server 1412 using software defined networking. In various aspects, server 1412 may be adapted to run one or more services or software applications described in the foregoing disclosure. For example, server 1412 may correspond to a server for performing processing described above according to an aspect of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to analyze and consolidate data feeds and/or event updates received from users of client computing devices 1402, 1404, 1406, and 1408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1412 may also include one or more applications to display the data feeds and/or real-time events via one or more display devices of client computing devices 1402, 1404, 1406, and 1408.

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of aspects, databases 1414 and 1416 may reside in a storage-area network (SAN). Similarly, any necessary files for performing the functions attributed to server 1412 may be stored locally on server 1412 and/or remotely, as appropriate. In one set of aspects, databases 1414 and 1416 may include relational databases, such as databases provided by Oracle, that are adapted to store, update, and retrieve data in response to SQL-formatted commands.

FIG. 15 is a simplified block diagram of one or more components of a system environment 1500 by which services provided by one or more components of an aspect system may be offered as cloud services in accordance with an aspect of the present disclosure. In the illustrated aspect, system environment 1500 includes one or more client devices 1504, 1506, and 1508 that may be used by users to interact with a cloud infrastructure system 1502 that provides cloud services. The client computing devices may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the aspect shown in the figure is only one example of a cloud infrastructure system that may incorporate an aspect of the invention. In some other aspects, cloud infrastructure system 1502 may have more or fewer components than shown in the figure, may combine two or more components, or may have a different configuration or arrangement of components.

Client devices 1504, 1506, and 1508 may be devices similar to those described above for 1402, 1404, 1406, and 1408.

Although exemplary system environment 1500 is shown with three client computing devices, any number of client computing devices may be supported. Other devices such as devices with sensors, etc. may interact with cloud infrastructure system 1502.

Network(s) 1510 may facilitate communications and exchange of data between client devices 1504, 1506, and 1508 and cloud infrastructure system 1502. Each network may be any type of network familiar to those skilled in the art that can support data communications using any of a variety of commercially-available protocols, including those described above for network(s) 1410.

Cloud infrastructure system 1502 may comprise one or more computers and/or servers that may include those described above for server 1412.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some aspects, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some aspects, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 1502 may also include infrastructure resources 1530 for providing the resources used to provide various services to customers of the cloud infrastructure system. In one aspect, infrastructure resources 1530 may include pre-integrated and optimized combinations of hardware, such as servers, storage, and networking resources to execute the services provided by the PaaS platform and the SaaS platform.

In some aspects, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 1502 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 1502, and the like.

In one aspect, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain aspects, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1502 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain aspects, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by system environment 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1542, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain aspects, cloud infrastructure system 1502 may include an identity management module 1528. Identity management module 1528 may be configured to provide identity services, such as access management and authorization services in cloud infrastructure system 1502. In some aspects, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.). Identity management module 1528 may also include the management of descriptive information about each customer and about how and by whom that descriptive information can be accessed and modified.

FIG. 16 illustrates an exemplary computer system 1600, in which various aspects of the present invention may be implemented. The computer system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1620 and a system memory 1610.

Bus subsystem 1602 provides a mechanism for letting the various components and subsystems of computer system 1600 communicate with each other as intended. Although bus subsystem 1602 is shown schematically as a single bus, alternative aspects of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1686.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain aspects, processing unit 1604 may be implemented as one or more independent processing units 1632 and/or 1634 with single or multicore processors included in each processing unit. In other aspects, processing unit 1604 may also be implemented as a quad-core processing unit formed by integrating two dual-core processors into a single chip.

In various aspects, processing unit 1604 can execute a variety of programs in response to program code and can maintain multiple concurrently executing programs or processes. At any given time, some or all of the program code to be executed can be resident in processing unit 1604 and/or in storage subsystem 1618. Through suitable programming, processing unit 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (4D) mice, joysticks or pointing sticks, gamepads and graphic tablets, and audio/visual devices such as speakers, digital cameras, digital camcorders, portable media players, webcams, image scanners, fingerprint scanners, barcode reader 4D scanners, 4D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 15 OS, and Palm® OS operating systems.

Storage subsystem 1618 may also provide a tangible computer-readable storage medium for storing the basic programming and data constructs that provide the functionality of some aspects. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present invention.

Storage subsystem 1618 may also include a computer-readable storage media reader 1620 that can further be connected to computer-readable storage media 1642. Together and, optionally, in combination with system memory 1610, computer-readable storage media 1642 may comprehensively represent remote, local, fixed, and/or removable storage devices plus storage media for temporarily and/or more permanently containing, storing, transmitting, and retrieving computer-readable information.

Computer-readable storage media 1642 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computer system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1620 may include, but is not limited to, Zip® drives, flash memory cards, universal serial bus (USB) flash drives, secure digital (SD) cards, DVD disks, digital video tape, and the like. Computer-readable storage media 1620 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some aspects, communications subsystem 1624 can include radio frequency (RF) transceiver components for accessing wireless voice and/or data networks (e.g., using cellular telephone technology, advanced data network technology, such as 4G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 1624 can provide wired network connectivity (e.g., Ethernet) in addition to or instead of a wireless interface.

In some aspects, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive unstructured data feeds 1626 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the FIG. are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method of automatically instrumenting a web application for tracing, the method comprising:
providing a web page application to a web browser on a client device, wherein the web page application comprises a tracer application that is configured to log tracing data for the web page application;
instantiating the tracer application based on a start of the web page application; and
automatically logging an end of a span based upon a completion of an operation corresponding to an event initiated by interaction with the web page application.

2. The method of claim 1, the method further comprising:
based on completion of an additional operation, automatically logging an additional end of an additional span corresponding to the additional operation; and
associating the additional span with the span.

3. The method of claim 1, wherein the span is a parent span, the method further comprising:
sending, based on the operation, a request for an object to an external server;
creating a child span based on the sending;

receiving the object from the external server; and
automatically logging an additional end of the child span responsive to receiving the object; and
associating the child span with the parent span.

4. The method of claim 1, wherein the event is selected from the group consisting of a click event, a navigation to a page, a user interface refresh, and a representational state transfer (REST) call.

5. The method of claim 1, wherein automatically logging the span comprises:
detecting the event;
logging the start of the span based on the detection;
executing operations corresponding to the event; and
following the executing, logging the end of the span.

6. The method of claim 1, wherein automatically logging the end of the span comprises determining one or more of: (i) a number of processing cycles corresponding to an execution of the operation or (ii) an execution time of the operation.

7. The method of claim 1, wherein the event is a click event and wherein the span represents instrumentation related to determining an action to perform based on the click event and performing the action.

8. A system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to:
provide a web page application to a web browser on a client device, wherein the web page application comprises a tracer application that is configured to log tracing data for the web page application;
instantiate the tracer application based on a start of the web page application; and
automatically log an end of a span based upon a completion of an operation corresponding to an event initiated by interaction with the web page application.

9. The system of claim 8, wherein executing the computer-executable program instructions further configures the processing device to:
based on completion of an additional operation, automatically log an additional end of an additional span corresponding to the additional operation; and
associate the additional span with the span.

10. The system of claim 8, wherein the span is a parent span, wherein executing the computer-executable program instructions further configures the processing device to: and
send, based on the operation, a request for an object to an external server;
create a child span based on the sending;
receive the object from the external server; and
automatically log an additional end of the child span responsive to receiving the object; and
associate the child span with the parent span.

11. The system of claim 8, wherein the event is selected from the group consisting of a click event, a navigation to a page, a user interface refresh, and a representational state transfer (REST) call.

12. The system of claim 8, wherein automatically logging the span comprises:
detecting the event;
logging the start of the span based on the detection;
executing operations corresponding to the event; and
following the executing, logging the end of the span.

13. The system of claim 8, wherein automatically logging the end of the span comprises determining one or more of: (i) a number of processing cycles corresponding to an execution of the operation or (ii) an execution time of the operation.

14. A non-transitory computer-readable storage medium storing computer-executable program instructions, wherein when executed by a processing device, the computer-executable program instructions cause the processing device to:
provide a web page application to a web browser on a client device, wherein the web page application comprises a tracer application that is configured to log tracing data for the web page application;
instantiate the tracer application based on a start of the web page application; and
automatically log an end of a span based upon a completion of an operation corresponding to an event initiated by interaction with the web page application.

15. The non-transitory computer-readable storage medium of claim 14, wherein the span is a parent span, and wherein when executed by the processing device, the computer-executable program instructions further cause the processing device to:
based on completion of an additional operation, automatically log an additional end of an additional span corresponding to the additional operation; and
associate the additional span with the span.

16. The non-transitory computer-readable storage medium of claim 14, wherein the span is a parent span, and wherein when executed by the processing device, the computer-executable program instructions further cause the processing device to:
send, based on the operation, a request for an object to an external server;
create a child span based on the sending;
receive the object from the external server; and
automatically log an additional end of the child span responsive to receiving the object; and
associate the child span with the parent span.

17. The non-transitory computer-readable storage medium of claim 14, wherein the event is selected from the group consisting of a click event, a navigation to a page, a user interface refresh, and a representational state transfer (REST) call.

18. The non-transitory computer-readable storage medium of claim 14, wherein automatically logging the span comprises:
detecting the event;
logging the start of the span based on the detection;
executing operations corresponding to the event; and
following the executing, logging the end of the span.

19. The non-transitory computer-readable storage medium of claim 14, wherein automatically logging the end of the span comprises determining one or more of: (i) a number of processing cycles corresponding to an execution of the operation or (ii) an execution time of the operation.

20. The non-transitory computer-readable storage medium of claim 14, wherein the event is a click event and wherein the span represents instrumentation related to determining an action to perform based on the click event and performing the action.

* * * * *

UNITED STATES PATENT AND TRADEMARK OFFICE
CERTIFICATE OF CORRECTION

| | |
|---|---|
| PATENT NO. | : 12,019,534 B2 |
| APPLICATION NO. | : 18/140849 |
| DATED | : June 25, 2024 |
| INVENTOR(S) | : Cirone et al. |

It is certified that error appears in the above-identified patent and that said Letters Patent is hereby corrected as shown below:

In the Drawings

On sheet 9 of 16, in FIG. 9, Line 16, delete "ract" and insert -- extract --, therefor.

On sheet 9 of 16, in FIG. 9, Line 17, delete "reate" and insert -- create --, therefor.

In the Specification

In Column 8, Line 10, delete "the a" and insert -- the --, therefor.

In Column 10, Line 43, delete "The" and insert -- the --, therefor.

In Column 11, Line 14, delete "can to" and insert -- can --, therefor.

In Column 20, Line 10, delete "with with" and insert -- with --, therefor.

In Column 22, Line 42, delete "Internet" and insert -- Internetwork --, therefor.

In Column 24, Line 27, delete "Web-based" and insert -- web-based --, therefor.

In Column 30, Line 33, delete "Web" and insert -- web --, therefor.

In Column 32, Line 27, delete "FIG." and insert -- figure --, therefor.

In the Claims

In Column 33, Line 50, in Claim 10, delete "to: and" and insert -- to: --, therefor.

Signed and Sealed this
Tenth Day of December, 2024

Katherine Kelly Vidal
*Director of the United States Patent and Trademark Office*